(12) United States Patent
Grant et al.

(10) Patent No.: US 7,742,036 B2
(45) Date of Patent: Jun. 22, 2010

(54) SYSTEM AND METHOD FOR CONTROLLING HAPTIC DEVICES HAVING MULTIPLE OPERATIONAL MODES

(75) Inventors: Danny A. Grant, Montreal (CA); Kollin M. Tierling, Milpitas, CA (US); Juan Manuel Cruz-Hernandez, Montreal (CA); Alex S. Goldenberg, San Francisco, CA (US)

(73) Assignee: Immersion Corporation, San Jose, CA (US)

( * ) Notice: Subject to any disclaimer, the term of this patent is extended or adjusted under 35 U.S.C. 154(b) by 1763 days.

(21) Appl. No.: 10/873,643

(22) Filed: Jun. 23, 2004

(65) Prior Publication Data

US 2005/0134562 A1 Jun. 23, 2005

Related U.S. Application Data

(60) Provisional application No. 60/530,979, filed on Dec. 22, 2003.

(51) Int. Cl.
G09G 5/08 (2006.01)
(52) U.S. Cl. .................. 345/156; 345/157; 345/158; 345/161; 414/5; 600/587
(58) Field of Classification Search ................ 345/156, 345/157, 158, 161; 414/5; 600/587
See application file for complete search history.

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,863,098 A | 1/1975 | Mehr |
| 3,902,687 A | 9/1975 | Hightower |
| 3,903,614 A | 9/1975 | Diamond et al. |
| 3,911,416 A | 10/1975 | Feder |

(Continued)

FOREIGN PATENT DOCUMENTS

EP 0 265 011 4/1988

(Continued)

OTHER PUBLICATIONS

International Search Report and Written Opinion, Application No. PCT/US04/40501, dated Mar. 12, 2007.

(Continued)

Primary Examiner—Bipin Shalwala
Assistant Examiner—Vincent E. Kovalick
(74) Attorney, Agent, or Firm—Squire, Sanders & Dempsey, LLP

(57) ABSTRACT

A haptic device having a plurality of operational modes, including a first operational mode and a second operational mode is provided. The first operational mode is associated with a frequency range. The second operational mode is associated with a frequency range that is different from the frequency range of the first operational mode. A controller is coupled to the haptic device, and is configured to send the haptic device a plurality of control schemes. Each control scheme is uniquely associated with an operational mode from the plurality of operational modes.

40 Claims, 15 Drawing Sheets

U.S. PATENT DOCUMENTS

| | | |
|---|---|---|
| 3,919,691 A | 11/1975 | Noll |
| 4,127,752 A | 11/1978 | Lowthorp |
| 4,148,014 A | 4/1979 | Burson |
| 4,160,508 A | 7/1979 | Salisbury, Jr. et al. |
| 4,236,325 A | 12/1980 | Hall et al. |
| 4,262,549 A | 4/1981 | Schwellenbach |
| 4,333,070 A | 6/1982 | Barnes |
| 4,464,117 A | 8/1984 | Foerst |
| 4,477,043 A | 10/1984 | Repperger |
| 4,484,191 A | 11/1984 | Vavra |
| 4,513,235 A | 4/1985 | Acklam et al. |
| 4,575,297 A | 3/1986 | Richter |
| 4,581,491 A | 4/1986 | Boothroyd |
| 4,599,070 A | 7/1986 | Hladky et al. |
| 4,708,656 A | 11/1987 | De Vries et al. |
| 4,713,007 A | 12/1987 | Alban |
| 4,771,344 A | 9/1988 | Fallacaro et al. |
| 4,794,392 A | 12/1988 | Selinko |
| 4,860,215 A * | 8/1989 | Seraji ......................... 700/260 |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 4,935,728 A | 6/1990 | Kley |
| 4,961,038 A | 10/1990 | MacMinn |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,047,942 A | 9/1991 | Middleton et al. |
| 5,047,952 A | 9/1991 | Kramer et al. |
| 5,078,152 A | 1/1992 | Bond |
| 5,103,404 A | 4/1992 | McIntosh |
| 5,165,897 A | 11/1992 | Johnson |
| 5,175,459 A | 12/1992 | Danial et al. |
| 5,186,629 A | 2/1993 | Rohen |
| 5,186,695 A | 2/1993 | Mangseth et al. |
| 5,212,473 A | 5/1993 | Louis |
| 5,240,417 A | 8/1993 | Smithson et al. |
| 5,264,836 A | 11/1993 | Rubin |
| 5,271,290 A | 12/1993 | Fischer |
| 5,275,174 A | 1/1994 | Cook |
| 5,280,265 A | 1/1994 | Kramer et al. |
| 5,283,970 A | 2/1994 | Aigner |
| 5,298,890 A | 3/1994 | Kanamaru et al. |
| 5,299,810 A | 4/1994 | Pierce |
| 5,309,140 A | 5/1994 | Everett |
| 5,334,027 A | 8/1994 | Wherlock |
| 5,374,942 A | 12/1994 | Gilligan et al. |
| 5,389,849 A | 2/1995 | Asano et al. |
| 5,436,622 A | 7/1995 | Gutman et al. |
| 5,437,607 A | 8/1995 | Taylor |
| 5,438,529 A | 8/1995 | Rosenberg et al. |
| 5,451,924 A | 9/1995 | Massimino et al. |
| 5,456,341 A | 10/1995 | Garnjost et al. |
| 5,459,382 A | 10/1995 | Jacobus et al. |
| 5,461,711 A | 10/1995 | Wang et al. |
| 5,466,213 A | 11/1995 | Hogan |
| 5,471,571 A | 11/1995 | Smith et al. |
| 5,513,100 A | 4/1996 | Parker et al. |
| 5,524,195 A | 6/1996 | Clanton, III et al. |
| 5,526,480 A | 6/1996 | Gibson |
| 5,547,382 A | 8/1996 | Yamasaki |
| 5,550,562 A | 8/1996 | Aoki et al. |
| 5,551,701 A | 9/1996 | Bouton et al. |
| 5,565,887 A | 10/1996 | McCambridge et al. |
| 5,565,888 A | 10/1996 | Selker |
| 5,570,111 A | 10/1996 | Barrett et al. |
| 5,575,761 A | 11/1996 | Hajianpour |
| 5,576,727 A | 11/1996 | Rosenberg et al. |
| 5,586,257 A | 12/1996 | Perlman |
| 5,592,401 A | 1/1997 | Kramer |
| 5,596,347 A | 1/1997 | Robertson et al. |
| 5,623,582 A | 4/1997 | Rosenberg |
| 5,628,686 A | 5/1997 | Svancarek et al. |
| 5,629,594 A | 5/1997 | Jacobus et al. |
| 5,676,157 A | 10/1997 | Kramer |
| 5,690,582 A | 11/1997 | Ulrich et al. |
| 5,691,898 A | 11/1997 | Rosenberg et al. |
| 5,696,532 A | 12/1997 | Caprara |
| 5,696,535 A | 12/1997 | Rutledge et al. |
| 5,701,140 A | 12/1997 | Rosenberg et al. |
| 5,709,219 A | 1/1998 | Chen et al. |
| 5,710,574 A | 1/1998 | Jaaskelainen, Jr. |
| 5,721,566 A | 2/1998 | Rosenberg et al. |
| 5,724,264 A | 3/1998 | Rosenberg et al. |
| 5,731,804 A | 3/1998 | Rosenberg |
| 5,734,373 A | 3/1998 | Rosenberg et al. |
| 5,739,811 A | 4/1998 | Rosenberg et al. |
| 5,742,278 A | 4/1998 | Chen et al. |
| 5,745,715 A | 4/1998 | Pickover et al. |
| 5,757,358 A | 5/1998 | Osga |
| 5,766,016 A | 6/1998 | Sinclair |
| 5,767,839 A | 6/1998 | Rosenberg |
| 5,785,630 A | 7/1998 | Bobick et al. |
| 5,791,992 A | 8/1998 | Crump et al. |
| 5,802,353 A | 9/1998 | Avila et al. |
| 5,805,140 A | 9/1998 | Rosenberg et al. |
| 5,805,165 A | 9/1998 | Thorne, III et al. |
| 5,805,601 A | 9/1998 | Takeda et al. |
| 5,808,601 A | 9/1998 | Leah et al. |
| 5,816,823 A | 10/1998 | Naimark et al. |
| 5,818,423 A | 10/1998 | Pugliese et al. |
| 5,821,920 A | 10/1998 | Rosenberg et al. |
| 5,825,308 A | 10/1998 | Rosenberg |
| 5,828,197 A | 10/1998 | Martin et al. |
| 5,841,423 A | 11/1998 | Carroll, Jr. et al. |
| 5,841,710 A | 11/1998 | Larsen |
| 5,844,392 A | 12/1998 | Peurach et al. |
| 5,857,986 A | 1/1999 | Moriyasu |
| 5,877,748 A | 3/1999 | Redlich |
| 5,877,750 A | 3/1999 | Hanson |
| 5,880,714 A | 3/1999 | Rosenberg et al. |
| 5,884,029 A | 3/1999 | Brush, II et al. |
| 5,889,670 A | 3/1999 | Schuler et al. |
| 5,896,125 A | 4/1999 | Niedzweicki |
| 5,896,139 A | 4/1999 | Strauss |
| 5,897,437 A | 4/1999 | Nishiumi et al. |
| 5,907,487 A | 5/1999 | Rosenberg et al. |
| 5,914,716 A | 6/1999 | Rubin et al. |
| 5,929,607 A | 7/1999 | Rosenberg et al. |
| 5,929,846 A | 7/1999 | Rosenberg et al. |
| 5,930,741 A | 7/1999 | Kramer |
| 5,952,806 A | 9/1999 | Muramatsu |
| 5,956,040 A | 9/1999 | Asano et al. |
| 5,956,484 A | 9/1999 | Rosenberg et al. |
| 5,959,613 A | 9/1999 | Rosenberg et al. |
| 5,973,670 A | 10/1999 | Barber et al. |
| 5,973,678 A | 10/1999 | Stewart et al. |
| 5,973,689 A | 10/1999 | Gallery |
| 5,977,977 A | 11/1999 | Kajiya et al. |
| 5,990,860 A | 11/1999 | Takeuchi |
| 5,990,875 A | 11/1999 | Bi et al. |
| 5,999,168 A | 12/1999 | Rosenberg et al. |
| 5,999,185 A | 12/1999 | Kato et al. |
| 6,001,014 A | 12/1999 | Ogata et al. |
| 6,008,800 A | 12/1999 | Pryor |
| 6,020,875 A | 2/2000 | Moore et al. |
| 6,020,876 A | 2/2000 | Rosenberg et al. |
| 6,024,576 A | 2/2000 | Bevirt et al. |
| 6,028,593 A | 2/2000 | Rosenberg et al. |
| 6,037,927 A | 3/2000 | Rosenberg |
| 6,042,555 A | 3/2000 | Kramer et al. |

| | | | |
|---|---|---|---|
| 6,046,726 A | 4/2000 | Keyson | |
| 6,046,727 A | 4/2000 | Rosenberg et al. | |
| 6,050,718 A | 4/2000 | Schena et al. | |
| 6,050,962 A | 4/2000 | Kramer et al. | |
| 6,057,828 A | 5/2000 | Rosenberg et al. | |
| 6,059,506 A | 5/2000 | Kramer | |
| 6,061,004 A | 5/2000 | Rosenberg | |
| 6,067,077 A | 5/2000 | Martin et al. | |
| 6,078,308 A | 6/2000 | Rosenberg et al. | |
| 6,078,876 A | 6/2000 | Rosenberg et al. | |
| 6,084,587 A | 7/2000 | Tarr et al. | |
| 6,088,017 A | 7/2000 | Tremblay et al. | |
| 6,088,019 A | 7/2000 | Rosenberg | |
| 6,100,874 A | 8/2000 | Schena et al. | |
| 6,101,530 A | 8/2000 | Rosenberg et al. | |
| 6,104,158 A | 8/2000 | Jacobus et al. | |
| 6,104,379 A | 8/2000 | Petrich et al. | |
| 6,104,382 A | 8/2000 | Martin et al. | |
| 6,110,130 A | 8/2000 | Kramer | |
| 6,111,562 A | 8/2000 | Downs et al. | |
| 6,111,577 A | 8/2000 | Zilles et al. | |
| 6,125,337 A | 9/2000 | Rosenberg et al. | |
| 6,125,385 A | 9/2000 | Wies et al. | |
| 6,128,006 A | 10/2000 | Rosenberg et al. | |
| 6,131,097 A | 10/2000 | Peurach et al. | |
| 6,134,506 A | 10/2000 | Rosenberg et al. | |
| 6,147,674 A | 11/2000 | Rosenberg et al. | |
| 6,148,280 A | 11/2000 | Kramer | |
| 6,154,198 A | 11/2000 | Rosenberg | |
| 6,154,201 A | 11/2000 | Levin et al. | |
| 6,157,367 A | 12/2000 | Van Der Haar et al. | |
| 6,160,489 A | 12/2000 | Perry et al. | |
| 6,160,907 A | 12/2000 | Robotham et al. | |
| 6,161,126 A | 12/2000 | Wies et al. | |
| 6,162,190 A | 12/2000 | Kramer | |
| 6,166,723 A | 12/2000 | Schena et al. | |
| 6,169,540 B1 | 1/2001 | Rosenberg et al. | |
| 6,181,318 B1 | 1/2001 | Lim | |
| 6,184,868 B1 | 2/2001 | Shahoian et al. | |
| 6,191,774 B1 | 2/2001 | Schena et al. | |
| 6,195,592 B1 | 2/2001 | Schuler et al. | |
| 6,211,861 B1 | 4/2001 | Rosenberg et al. | |
| 6,215,470 B1 | 4/2001 | Roseberg et al. | |
| 6,215,495 B1 | 4/2001 | Grantham et al. | |
| 6,216,059 B1 | 4/2001 | Ierymenko | |
| 6,219,032 B1 | 4/2001 | Rosenberg et al. | |
| 6,219,034 B1 | 4/2001 | Elbing et al. | |
| 6,232,891 B1 | 5/2001 | Rosenberg | |
| 6,243,078 B1 | 6/2001 | Rosenberg | |
| 6,246,390 B1 | 6/2001 | Rosenberg | |
| 6,252,579 B1 | 6/2001 | Rosenberg et al. | |
| 6,252,583 B1 | 6/2001 | Braun et al. | |
| 6,256,011 B1 | 7/2001 | Culver | |
| 6,262,738 B1 * | 7/2001 | Gibson et al. | 345/419 |
| 6,266,053 B1 | 7/2001 | French et al. | |
| 6,271,828 B1 | 8/2001 | Rosenberg et al. | |
| 6,271,833 B1 | 8/2001 | Rosenberg et al. | |
| 6,275,213 B1 * | 8/2001 | Tremblay et al. | 345/156 |
| 6,278,439 B1 | 8/2001 | Rosenberg et al. | |
| 6,282,455 B1 | 8/2001 | Engdahl | |
| 6,283,859 B1 | 9/2001 | Carlson et al. | |
| 6,285,351 B1 | 9/2001 | Chang et al. | |
| 6,288,705 B1 | 9/2001 | Rosenberg et al. | |
| 6,292,170 B1 | 9/2001 | Chang et al. | |
| 6,292,174 B1 | 9/2001 | Mallett et al. | |
| 6,300,936 B1 | 10/2001 | Braun et al. | |
| 6,300,937 B1 | 10/2001 | Rosenberg | |
| 6,300,938 B1 | 10/2001 | Culver | |
| 6,310,605 B1 | 10/2001 | Rosenberg et al. | |
| 6,317,116 B1 | 11/2001 | Rosenberg et al. | |
| 6,323,837 B1 | 11/2001 | Rosenberg | |
| 6,326,964 B1 | 12/2001 | Snyder et al. | |
| 6,348,911 B1 | 2/2002 | Rosenberg et al. | |
| 6,353,427 B1 | 3/2002 | Rosenberg | |
| 6,366,272 B1 | 4/2002 | Rosenberg et al. | |
| 6,373,463 B1 | 4/2002 | Beeks | |
| 6,374,255 B1 | 4/2002 | Peurach et al. | |
| 6,411,276 B1 | 6/2002 | Braun et al. | |
| 6,413,229 B1 | 7/2002 | Kramer et al. | |
| 6,422,941 B1 | 7/2002 | Thorner et al. | |
| 6,424,333 B1 | 7/2002 | Tremblay et al. | |
| 6,424,356 B2 | 7/2002 | Chang et al. | |
| 6,428,490 B1 | 8/2002 | Kramer et al. | |
| 6,429,846 B2 | 8/2002 | Rosenberg et al. | |
| 6,433,771 B1 * | 8/2002 | Yocum et al. | 345/156 |
| 6,448,977 B1 | 9/2002 | Braun et al. | |
| 6,469,692 B2 | 10/2002 | Rosenberg | |
| 6,469,695 B1 | 10/2002 | White | |
| 6,486,872 B2 | 11/2002 | Rosenberg et al. | |
| 6,525,711 B1 | 2/2003 | Shaw et al. | |
| 6,621,448 B1 * | 9/2003 | Lasky et al. | 342/22 |
| 6,636,197 B1 | 10/2003 | Goldenberg et al. | |
| 6,639,581 B1 | 10/2003 | Moore et al. | |
| 6,686,901 B2 | 2/2004 | Rosenberg | |
| 6,686,911 B1 | 2/2004 | Levin et al. | |
| 6,693,626 B1 | 2/2004 | Rosenberg | |
| 6,697,043 B1 | 2/2004 | Shahoian | |
| 6,697,044 B2 | 2/2004 | Shahoian et al. | |
| 6,697,748 B1 | 2/2004 | Rosenberg et al. | |
| 6,704,001 B1 | 3/2004 | Schena et al. | |
| 6,707,443 B2 | 3/2004 | Bruneau et al. | |
| 6,717,573 B1 | 4/2004 | Shahoian et al. | |
| 6,859,819 B1 | 2/2005 | Rosenberg et al. | |
| 6,876,891 B1 | 4/2005 | Schuler et al. | |
| 6,894,678 B2 | 5/2005 | Rosenberg et al. | |
| 2001/0002126 A1 | 5/2001 | Rosenberg et al. | |
| 2001/0026266 A1 | 10/2001 | Schena et al. | |
| 2002/0030663 A1 | 3/2002 | Tierling et al. | |
| 2002/0033795 A1 | 3/2002 | Shahoian et al. | |
| 2002/0054060 A1 | 5/2002 | Schena | |
| 2002/0072814 A1 | 6/2002 | Schuler et al. | |
| 2002/0097223 A1 | 7/2002 | Rosenberg | |
| 2002/0109668 A1 | 8/2002 | Rosenberg et al. | |
| 2002/0128048 A1 | 9/2002 | Aaltonen et al. | |
| 2002/0133093 A1 * | 9/2002 | Mayrose et al. | 600/587 |
| 2002/0142701 A1 | 10/2002 | Rosenberg | |
| 2002/0177471 A1 | 11/2002 | Kaaresoja et al. | |
| 2003/0022701 A1 | 1/2003 | Gupta | |
| 2003/0025679 A1 | 2/2003 | Taylor et al. | |
| 2003/0030619 A1 | 2/2003 | Martin et al. | |
| 2003/0030628 A1 | 2/2003 | Sato et al. | |
| 2003/0038776 A1 | 2/2003 | Rosenberg et al. | |
| 2003/0067440 A1 * | 4/2003 | Rank | 345/156 |
| 2003/0068053 A1 | 4/2003 | Chu | |
| 2003/0071795 A1 | 4/2003 | Baldauf et al. | |
| 2003/0095105 A1 | 5/2003 | Vaananen | |
| 2003/0128192 A1 | 7/2003 | van Os | |
| 2003/0151597 A1 | 8/2003 | Roberts et al. | |
| 2003/0174121 A1 | 9/2003 | Poupyrev et al. | |
| 2003/0188594 A1 | 10/2003 | Levin et al. | |
| 2003/0201975 A1 | 10/2003 | Bailey et al. | |
| 2004/0233161 A1 | 11/2004 | Shahoian et al. | |
| 2005/0134562 A1 * | 6/2005 | Grant et al. | 345/161 |

FOREIGN PATENT DOCUMENTS

| | | |
|---|---|---|
| EP | 0349086 | 1/1990 |
| EP | 0 556 999 | 8/1993 |
| EP | 0 607 580 | 7/1994 |
| EP | 0 626 634 | 11/1994 |
| EP | 0 640 902 | 3/1995 |
| EP | 0 980 037 | 2/2000 |
| GB | 2 254 911 | 10/1992 |
| JP | H2-185278 | 7/1990 |
| JP | 3-97485 | 4/1991 |
| JP | H4-8381 | 1/1992 |

| | | |
|---|---|---|
| JP | H5-192449 | 8/1993 |
| JP | H7-24147 | 1/1995 |
| SU | 1335994 | 9/1987 |
| SU | 1732371 | 5/1992 |
| WO | 95/20788 | 8/1995 |
| WO | 95/21436 | 8/1995 |
| WO | 95/32459 | 11/1995 |
| WO | 98/10387 | 3/1998 |
| WO | 99/38141 | 7/1999 |
| WO | 99/40504 | 8/1999 |
| WO | 00/03319 | 1/2000 |
| WO | 00/25294 | 5/2000 |
| WO | 01/03105 | 1/2001 |
| WO | 01/13354 | 2/2001 |
| WO | 01/24158 | 4/2001 |
| WO | 02/12991 | 2/2002 |
| WO | 02/27645 | 4/2002 |
| WO | 02/27705 | 4/2002 |
| WO | 02/31807 | 4/2002 |

OTHER PUBLICATIONS

Baigrie, "Electric Control Loading—A Low Cost, High Performance Alternative," *Proceedings of Interservice/Industry Training Systems Conference*, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," MIT Libraries Archives, pp. 1-131, May 1990, archived Aug. 14, 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., "Model-X Force-Reflecting-Hand-Controller," NT Control No. NPO-17851; JPL Case No. 7348, pp. 1-4, with 45 pages of attachments, Jun. 15, 1989.

Ouh-Young, "Force Display in Molecular Docking," Doctoral Dissertation, University of North Carolina at Chapel Hill, UMI Order No. 9034744, pp. 1-369, 1990.

Tadros, Control System Design for a Three Degree of Freedom Virtual Environment Simulator Using Motor/Brake Pair Actuators, *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein, "Design and Implementation of a Force Reflecting Manipulandum for Manual Control research," DSC-vol. 42, *Advances in Robotics*, pp. 1-12, 1992.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al., Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," Science, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

Mcaffee, "Teleoperator Subsystem/Telerobot Demonsdtrator: Force Reflecting Hand Controller Equipment Manual," *JPL* D-5172, Jan. 1988.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fouteenth Annual Northeast Bioengineering Conference*, University of New Hampshire, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contactor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System for Dual-Arm Teleoperation," *SOAR '89 Workshop*, JSC, Houston, TX, Jul. 25-27, 1989.

Ouh-Young, "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) for Space Telerobots," CH2413-3/87/0000/0318501.00 1987 IEEE, 1987.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of a Force-Feedback Touch-Introducing Actuator for Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," Presence, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control*: vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," 2nd Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of a Low-Cost Force Feedback Joystick and Its Use in the Virtual Reality Environment," *Proceedings of the Third Pacific Conference on Computer Graphics and Applications, Pacific Graphics '95*, Seoul, Korea, Aug. 21-24, 1995.

Lake, "Cyberman from Logitech," at http://www.ibiblio.org/GameBytes/issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Noll, "Man-Machine Tactile," *SID Journal*, Jul./Aug. 1972 Issue.

Rosenberg, "Virtual Fixtures: Perceptual Overlays Enhance Operator Performance in Telepresence Tasks," *Ph.D. Dissertation*, Stanford University, Jun. 1994.

Adachi, Y., et al., "Sensory Evaluation of Virtual Haptic Push-Buttons," Technical Research Center, Suzuki Motor Corporation, (Nov. 1994).

Adelstein, B., "A Virtual Environment System For The Study of Human Arm Tremor," Ph.D. Dissertation, Dept. of Mechanical Engineering, MIT, (Jun. 1989).

"Cursor Waldo," Designer's Corner-Useful Technology for Your Idea File, Design News, p. 63, (Mar. 7, 1994).

Akamatsu, M., et al., "Multi-Modal Mouse: A Mouse type device with tactile and force display," Presence, vol. 3 No. 1, 73-80, (1994).

Atari Games Technical Publication Department, "Hard Drivin' Operator's Manual with Illustrated Parts List," Atari Games Corporation, Milpitas, CA, 1989.

Aukstakalnis, S. et al., "*Silicon Mirage: The Art and Science of Virtual Reality*," Berkeley, CA, Peach Pit Press, pp. 129-180, (1992).

Ballard, J.W., et al., "Human-engineered Electromechanical Tactual Sensory Control System", Electrical Manufacturing, pp. 118-121, (Oct. 1954).

Bejczy, A., "Sensors, Controls, and Man-Machine Interface for Advanced Teleoperation," *Science*, vol. 208, No. 4450, pp. 1327-1335, 1980.

Bergamasco, M., "Haptic interfaces: the study of force and tactile feedback systems," Proceedings of the 4th IEEE International Workshop on Robot and Human Communication, 1995, Tokyo, Japan, pp. 15-20.

Brooks,F.P.,et al., "Project Grope: Haptic displays for scientific visualization," Computer Graphics: Proc. of SIGGRAPH 90, vol. 24, pp. 177-185, (Aug. 1990).

Burdea, G., et al., "Dextrous telerobotics with force feedback-an overview, Parts I and II", Robotica, vol. 9, pp. 171-178 and 291-298, (1991).

Buttolo, P., et al., "Pen based force display for precision manipulation of virtual environments," Virtual Reality Annual International Symposium (VRAIS'95), Research Triangle Park, NC, Mar. 11-15, 1995, IEEE, pp. 217-225, (Mar. 1995).

Calder, B., "Design of a force-feedback touch-inducing actuator for teleoperator robot control," Thesis (B.S.)-Massachusetts Institute of Technology, Dept. of Mechanical Engineering, Cambridge, MA, (1983).

Durlach, N., et al., (Editors.), "Virtual reality: scientific and technological challenges," National Academy Press, Washington, D. C., (1995).

Ellis, R.E., et al., "Design and and Evaluation of a High-Performance Prototype Planar Haptic Interface", DSC-vol. 49, Advances in Robotics, Mechatronics and Haptic Interfaces, ASME 1993, pp. 55-64, (1993).

Gotow, J.K. et al., "Controlled Impedance Test Apparatus for Studying Human Interpretation of Kinesthetic Feedback," Proceedings of the 1989 American Control Conference, Pittsburgh, PA, Jun. 21-23, 1989, pp. 332-337, (1989).

Gotow, J.K., et al., "Perception of Mechanical Properties at the Man-Machine Interface," Proceedings of the 1987 IEEE International Conference on Systems, Man, and Cybernetics, Alexandria, VA, Oct. 20-23, 1987, pp. 688-689, (1987).

Hahn, James K., et al., "Training Environment for Inferior Vena Caval Filter Placement," Proceedings of MMVR, Medicine Meets Virtual Reality, San Diego, CA, Jan. 28-21, 1998, (1998).

Hogan, N., et al., "Haptic illusions: Experiments on human manipulation and perception of virtual objects", Cold Spring Harbor Symposia on Quantitative Biology, vol. 55, pp. 925-931, (1990).

IBM Corporation, "Mouse Ball-actuating Device with Force and Tactile Feedback," IBM Technical Disclosure Bulletin, vol. 32, No. 9B, pp. 230-235, (Feb. 1990).

Iwata, H., "Artificial Reality with Force-feedback: Development of Desktop Virtual Space with Compact Master Manipulator," Computer Graphics, vol. 24, No. 4, pp. 165-170, (1990).

Iwata, H., et al., "Volume Haptization", Proceedings of the IEEE 1993 Symposium on Research Frontiers in Virtual Reality, pp. 16-23, (1993).

Jackson, K., "Linearity of Radio-Frequency Transducers," Medical & Biological Engineering and Computing, vol. 15, pp. 446-449, (Jul. 1997).

Jones, L. et al., "A Perceptual Analysis of Stiffness," Experimental Brain Research, vol. 79, No. 1, pp. 150-156, (1990).

Kelley, A., "MagicMouse: Tactile and Kinesthetic Feedback in the Human-Computer Interface using an Electromagnetically Actuated Input/Output Device," Dept. of Elec. Engineering, Univ. of British Columbia, Vancouver, BC, pp. 1-27, (1993).

Kelley, A., et al., "On the Development of a Force-Feedback Mouse and Its Integration into a Graphical User Interface," Proceedings ASME Winter Annual Meeting, DSC-vol. 55-1, Dynamic Systems and Control, pp. 287-294, (1994).

Kim, W., et al, "A teleoperation training simulator with visual and kinesthetic force virtual reality," Human Vision, Visual Processing, and Digital Display III: Feb. 10-13, 1992 San Jose, California, SPIE Proceedings, vol. 1666, pp. 560-569, (1992).

Kim, W., et al., "Graphics Displays for Operator Aid in Telemanipulation," Proceedings of the 1991 IEEE International Conference on Systems, Man, and Cybernetics, pp. 1059-1067, (1991).

MacLean, K.et al, "An Architecture for Haptic Control of Media," The Proceedings of the ASME Dynamic Systems and Control Division: 1999 International Mechanical Engineering Congress and Exposition, Eighth Annual Symposium on Haptic Interfaces for Virtual Environment and Teleoperator Systems, Nashville, TN:, Nov. 14-19, pp. 1-10, (1999).

Massie, T., "Design of a Three Degree of Freedom Force-Reflecting Haptic Interface," Bachelor of Science In Electrical and Engineering Thesis, Massachusetts Institute of Technology, Cambridge, MA, , pp. 1-38, (May 1993).

Minsky, M., et al., "Feeling and Seeing: Issues in Force Display," Proc. Symposium on Interactive 3D Graphics, Snowbird, UT, 1990 ACM, pp. 235-242, 270, (1990).

Munch, S., et al., "Intelligent Control for Haptic Displays," Computer Graphics Forum, vol. 15, No. 3, pp. C217-C226, Conference Issue, EUROGRAPHICS'96, Poitiers, France, Aug. 26-30, 1996, Eurographics Association, (Sep. 1996).

Noll, A., "Man-Machine Tactile Communication," Dissertation for Polytechnic Institute of Brooklyn, Brooklyn, NY, (1971).

Noma, M., et al., "Cooperative Object Manipulation in Virtual Space using Virtual Physics", Proceedings of the ASME Dynamic Systems and Control Division, presented at the 1997 ASME International Mechanical Engineering Congress and Exposition, Nov. 16-21, 1997, Dallas, Texas, ASME-DSC-vol. 61, (1997).

Patrick, N., et al., "Design and Testing of a Non-reactive, Fingertip, Tactile Display for Interaction with Remote Environments," Cooperative Intelligent Robotics in Space, Proceedings of the SPIE, vol. 1387, pp. 215-222, (1990).

Pimentel, K. et al., "Virtual Reality: Through The New Looking Glass," McGraw-Hill Inc., New York, NY, chapters 3-8, pp. 41-202 (1995).

Rosenberg, L., ""Virtual Fixtures": Perceptual Overlays Enhance Operator Performance in Telepresence Tasks," Ph.D. Dissertation, Stanford University, Stanford, CA, (Aug. 1994).

Rosenberg, L., "Perceptual Design of a Virtual Rigid Surface Contact," AL/CF-TR-1995-0029, Air Force Material Command, Wright-Patterson Air Force Base, OH, pp. 1-40, (Apr. 1993).

Rosenberg, L., "The Use of Virtual Fixtures to Enhance Operator Performance in Time Delayed Teleoperation", Air Force Material Command, Wright-Patterson Air Force Base, OH, (Mar. 1993).

Rosenberg, L., "Virtual haptic overlays enhance performance in teleprescence tasks," Stanford University, Department of Mechanical Engineering, Stanford, CA, (1994).

Rosenberg, L., et al., "Perceptual decomposition of virtual haptic surfaces," Proceedings of the IEEE 1993 Symposium on Research Frontiers in Virtual Reality, San Jose, Calif. Oct. 23-26, 1993, IEEE Computer Society Press, pp. 46-53, (1993).

Rosenberg, L., et al,. "Commercially Viable Force Feedback Controller for Individuals with Neuromotor Disabilities," Crew Systems Directorate, Biodynamics and Biocommunications Division, Wright Patterson AFB, OH, pp. 1-33, (May 1996).

Rosenberg, L., et al., "Using Force Feedback to Enhance Human Performance in Graphical User Interfaces", CHI '96 Companion, Vancouver, BC, 1996 ACM, Apr. 13-18, pp. 291-292, 1996.

Salisbury, J., et al., "Virtual Environment Technology for Training (VETT), III-A-1-C. Haptic Interfaces," BBN Report No. 7661, prepared by the Virtual Environment and Teleoperator Research Consortium (VETREC) affiliated with MIT, pp. III-A-27-III-A-40, (Mar. 1992).

Salisbury, K., et al "Haptic Rendering: Programming Touch Interaction with Virtual Objects,"1995 Symposium on Interactive 3D Graphics, Monterey, CA, pp. 123-130, (1995).

Schmult, B., et al., "Application Areas for a Force-Feedback Joystick", DSC-vol. 49, Advances in Robotics, Mechatronics, and Haptic Interfaces, ASME 1993, pp. 47-54, (1993).

Shahinpoor, M., "A New Effect in Ionic Polymeric Gels : The Ionic Flexogelectric Effect," Proc. SPIE 1995 North American Conference on Smart Structures and Materials, Feb. 28-Mar. 2, 1995, San Diego, CA, vol. 2441, paper No. 05, pp. 42-53 (1995).

Su, S., et al., "The Virtual Panel Architecture: A 3D Gesture Framework," 1993 IEEE Virtual Reality Annual International Symposium (VRAIS 1993), Sep. 18-22, 1993, Seattle, WA, pp. 387-393, (1993).

Tan, H. et al, "Human Factors for the Design of Force-Reflecting Haptic Interfaces," ASME WAM 1994, pp. 1-11 (1994).

Tan, H. et al., "Manual Resolution of Compliance When Work and Force Cues are Minimized," Advances in Robotics, Mechatronics, and Haptic Interfaces, DSC-vol. 49, ASME 1993, pp. 99-104, (1993).

Unknown Authors, "Hard Drivin' Schematic Package," Atari Games Corporation, Milpitas, CA, 1989.

Voyles, R., et al., "Design of a Modular Tactile Sensor and Actuator Based on an Electrorheological Gel," Proceedings of the 1996 IEEE International Conference on Robotics and Automation, Minneapolis, MN—Apr. 1996 (1996).

Yamakita, M. et al., "Tele Virtual Reality of Dynamic Mechanical Model," Proceedings of the 1992 IEEE/RSJ Conference on Intelligent Robots and Systems, Raleigh, NC, Jul. 7-10, 1992 (1992).

Hill, J. et al., "Telepresence Technology in Medicine: Principles and Applications", Proceedings of the IEEE, vol. 86, No. 3, pp. 569-580, Mar. 1998 (1998).

Hon, D., "Ixion's Realistic Medical Simulations" Virtual Reality World, vol. 2, No. 4, pp. 58-62, Jul./Aug. 1994.

Fukumoto, M. et al. "Active Click: Tactile Feedback for Touch Panels", ACM CHI2001 Extended Abstracts, pp. 121-122, Apr. 2001.

"Special Issue on Virtual and Augmented Reality in Medicine", Proceedings of the IEEE, vol. 86, No. 3, pp. 471-473, Mar. 1998.

Merril, J. et al., "Virtual Heart Surgery: Trade Show and Medical Education", Virtual Reality World, vol. 2, No. 4, pp. 55-57, Jul./Aug. 1994.

Merril, J. et al., "Virtual Reality for Trade Shows and Individual Physician Training", Virtual Reality Systems, vol. 1, No. 3, pp. 40-44 (1994).

* cited by examiner

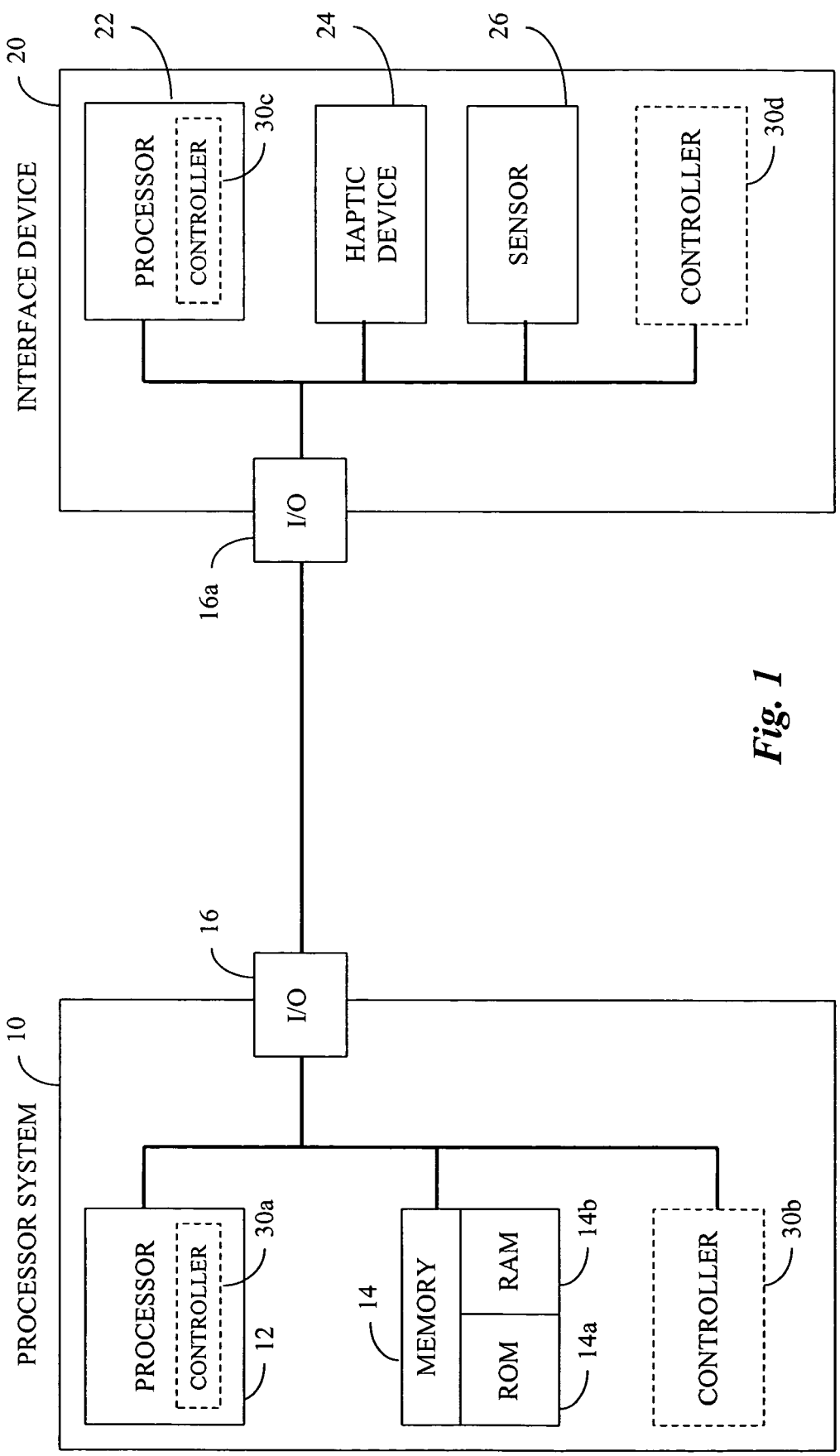

SYSTEM AND METHOD FOR CONTROLLING HAPTIC DEVICES HAVING MULTIPLE OPERATIONAL MODES

PRIORITY

This Application claims priority to U.S. Provisional Patent Application No. 60/530,979, file on Dec. 22, 2003, entitled, "System and Method for Controlling Haptic Devices Having Multiple Operational Modes," the entire disclosure of which is incorporated herein by reference.

BACKGROUND

The invention relates generally to haptic feedback devices. More specifically, the invention relates to controlling haptic devices each having multiple operational modes.

Computer users often use interface devices to provide information to computers or other electronic devices. For example, with such interface devices, a user can interact with an environment displayed by a computer to perform functions and tasks on the computer, such as playing a game, experiencing a simulation or virtual reality environment, using a computer aided design system, operating a graphical user interface (GUI), or otherwise affecting processes or images depicted on an output device of the computer. Common human interface devices for computers or electronic devices include, for example, a joystick, button, mouse, trackball, knob, steering wheel, stylus, tablet, pressure-sensitive ball, remote control, wireless phone, and stereo controls.

In some interface devices, feedback, such as force feedback, can also be provided to a user. Each of these interface devices, for example, includes one or more haptic devices, which are connected to a controlling processor and/or computer. Consequently, by a controlling processor, controller, and/or computer, haptic forces produced by the haptic device can be controlled in coordination with actions of the user and/or events associated with an audible environment or a graphical or displayed environment by sending control signals or commands to haptic feedback device.

Multi-mode haptic devices that provide desirable performance have been developed. For example, U.S. application Ser. No. 10/301,809, entitled, "Haptic Feedback Using Rotary Harmonic Moving Mass," the entire disclosure of which is incorporated herein by reference, discloses haptic feedback using a device having a rotary harmonic moving mass. Accordingly, additional systems and methods for controlling multi-mode haptic devices are desirable.

SUMMARY

An embodiment of the invention provides a system and method for controlling multi-mode haptic devices. A haptic device having multiple operational modes, including a first operational mode and a second operational mode is provided. The first operational mode is associated with a frequency range. The second operational mode is associated with a frequency range that is different from the frequency range of the first operational mode. A controller is coupled to the haptic device, and is configured to send the haptic device multiple control schemes. Each control scheme is uniquely associated with an operational mode from the multiple operational modes. According to an embodiment of the invention, the controller is configured to combine each control scheme from the multiple control schemes prior to sending the multiple control schemes to the haptic device.

Another embodiment of the invention provides a method that uses a voltage pulse to reduce the response time of a device. According to this method, steady-state power is provided to a haptic device that is configured to cause the haptic device to output a haptic sensation above a pre-determined sensation threshold. A voltage pulse, which is configured to change the haptic sensation output by the haptic device by a pre-determined amount within a pre-determined, reduced response time, is applied to the haptic device. According to an embodiment of the invention, the voltage pulse is applied to the haptic device prior to providing the steady-state power to the haptic device. According to another embodiment, the voltage pulse is applied to the haptic device after terminating the steady-state power provided to the haptic device. The voltage pulse can be applied to a single-mode haptic device or a multi-mode haptic device. According to one or more embodiments of the invention, use of such a voltage pulse can improve response time of a haptic device to which the pulse is applied (e.g., for stopping or starting haptic effects, etc.).

BRIEF DESCRIPTION OF THE DRAWINGS

FIG. 1 is a block diagram of a system including a processor system and an interface device, according to an embodiment of the invention.

DETAILED DESCRIPTION

Figure 2A:
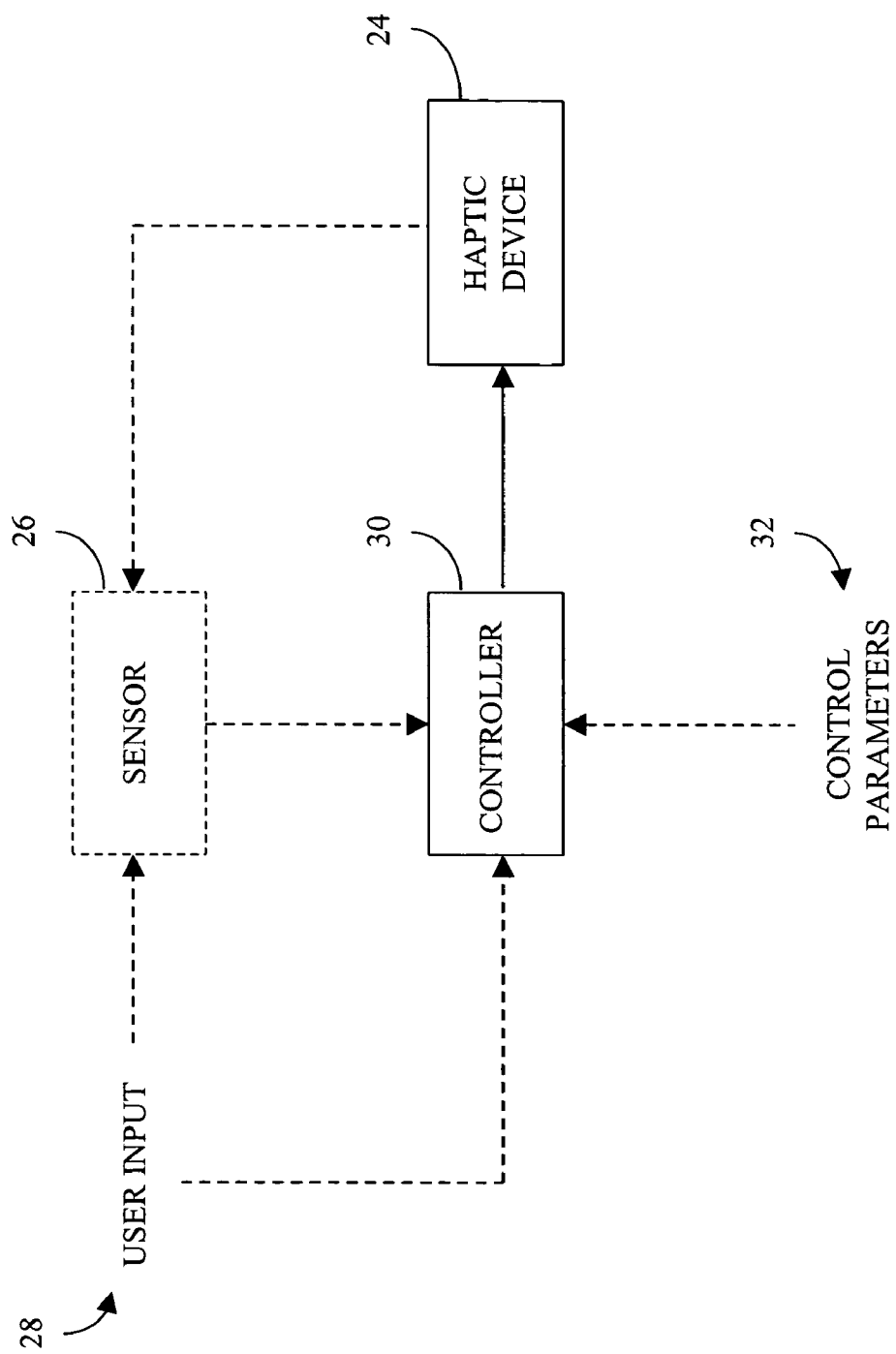
FIG. 2A is a diagram illustrating a haptic device, a controller, and a sensor, according to an embodiment of the invention.

Systems and methods for controlling multi-mode haptic devices are described. More specifically, an embodiment of the invention is described in the context of a haptic device that has a multiple operational modes, each of which is associated with a frequency range. A controller is coupled to the haptic device and is configured to send the haptic device multiple control schemes associated with the multiple operational modes.

Feedback provided via a haptic device is sometimes referred to as vibrotactile feedback or kinesthetic feedback, and is referred to more generally herein as "haptic feedback." Such haptic feedback can be provided, for example, by way of a haptic device or an interface device including a haptic device. Interface devices that provide haptic feedback can provide physical sensations that can be measured by some metric (e.g., perceivable frequency content), and can be felt by a user using a controller or manipulating a physical object of the interface device.

According to an embodiment of the invention, a haptic device has multiple operational modes. A first operational mode is associated, for example, with a high-frequency range, and a second operational mode is associated, for example, with a low-frequency range control scheme associated with each of the operational modes can be sent to the haptic device; each of the control schemes can cause the haptic device to provide a particular haptic feedback. The control scheme associated with each frequency range can be combined (e.g., superimposed, added, multiplied, convolved, combined by a non-vectored operation, etc.) with one or more remaining control schemes, or otherwise operated on, according to pre-determined rules to provide a transitional response between the frequency ranges. In this manner, an embodiment of the invention provides for a "blending" or "transitioning" of haptic feedback from a low-frequency range to a high-frequency range such that the performance over and between the low- and high-frequency ranges is relatively seamless.

According to another embodiment of the invention, a haptic device having multiple operational modes is provided. The multiple operational modes of the haptic device include, for example, a low-frequency operational mode, a high-frequency operational mode, and a transitional operational mode, which is associated with frequencies between low frequencies associated with the low-frequency mode and high frequencies associated with the high-frequency mode. The low-frequency operational mode is sometimes referred to herein as "unidirectional" (e.g., unidirectional spinning of a rotational device), and the high-frequency operational mode is sometimes referred to herein as "harmonic" or "oscillating." The transitional operational mode is associated with a transitional frequency range that combines a superposed response of the unidirectional mode and the harmonic mode. The low-frequency operational mode is associated with, for example, frequencies up to approximately 10 Hz, and the high-frequency operational mode is associated with frequencies, for example, above approximately 10 Hz. A transitional frequency range associated with the transitional operational mode includes, for example, frequencies from about 5 Hz to about 25 Hz, where the low-frequency and high-frequency operational modes are associated with frequencies below and above the transitional frequency range, respectively.

FIG. 1 is a block diagram of a system having a processor system 10 and an interface device, according to an embodiment of the invention. The system illustrated in FIG. 1 includes a processor system 10 in communication with an interface device 20. The processor system 10 can be, for example, a commercially available personal computer or a less complex computing or processing device that is dedicated to performing one or more specific tasks. For example, the processor system 10 can be a terminal dedicated to providing an interactive virtual reality environment, such as a gaming system, or the like.

The processor system 10 includes a processor 12, which according to one or more embodiments of the invention, can be a commercially available microprocessor. Alternatively, the processor 12 can be an application-specific integrated circuit (ASIC) or a combination of ASICs, which is designed to achieve one or more specific functions, or enable one or more specific devices or applications. In yet another alternative, the processor 112 can be an analog or digital circuit, or a combination of multiple circuits.

Alternatively, the processor 12 can optionally include one or more individual sub-processors or coprocessors. For example, the processor can include a graphics coprocessor that is capable of rendering graphics, a controller that is capable of controlling one or more devices, a sensor that is capable of receiving sensory input from one or more sensing devices, and so forth.

The processor system 10 also includes a memory component 14. As shown in FIG. 1, the memory component 14 can include one or more types of memory. For example, the memory component 14 can include a read only memory (ROM) component 14A and a random access memory (RAM) component 14B. The memory component 14 can also include other types of memory not illustrated in FIG. 1 that are suitable for storing data in a form retrievable by the processor 12. For example, electronically programmable read only memory (EPROM), erasable electrically programmable read only memory (EEPROM), flash memory, as well as other suitable forms of memory can be included within the memory component 14. The processor system 10 can also include a variety of other components, depending upon the desired functionality of the processor system 10.

The processor 12 is in communication with the memory component 14, and can store data in the memory component 14 or retrieve data previously stored in the memory component 14. The components of the processor system 10 can communicate with devices external to the processor system 10 by way of an input/output (I/O) component 16. According one or more embodiments of the invention, the I/O component 16 can include a variety of suitable communication interfaces. For example, the I/O component 16 can include, for example, wired connections, such as standard serial ports, parallel ports, universal serial bus (USB) ports, S-video ports, large area network (LAN) ports, small computer system interface (SCSI) ports, audio ports, and so forth. Additionally, the I/O component 16 can include, for example, wireless connections, such as infrared ports, optical ports, Bluetooth wireless ports, wireless LAN ports, or the like.

By way of the I/O component 16, the processor system 10 can communicate with other devices, such as interface devices 20. These interface devices 20 can be configured to provide haptic feedback. Each interface device 20 can communicate with the processor system 10 by way of an I/O component 16a, which is similar to the I/O component 16 of the processor system 10 and can include any of the wired or wireless communications ports described above in connection with that I/O component 16. Thus, the communications link between the I/O component 16 of the processor system 10 and the I/O component 16a of the interface device 20 can take a variety of forms, including, for example, wired communications links, wireless communications links (e.g., RF links), optical communications links, or other suitable links.

The interface device 20 includes a number of components, such as a processor 22, a haptic device 24, and a sensor 26. As with the components of the processor system 10, the interface device 20 can include additional components. For example, the interface device can include additional duplicates of the components shown in FIG. 1 (e.g., the interface device 20 can include multiple processors 22, haptic devices 24, sensors 26 and/or controllers 30, etc.). Additionally, the interface device 20 can include other components not shown in the figure. For example, where it is desirable to store data received by the interface device 20 via I/O component 16a, a suitable memory component or buffer memory component can be used. The interface can also include power-sourcing circuitry, an example of which can be seen in U.S. Pat. No. 5,929,607, entitled, "Low Cost Force Feedback Interface with Efficient Power Sourcing," the disclosure of which is incorporated by reference herein in its entirety.

The processor 22 of the interface device 20, can be similar to the processor 12 of the processor system 10, described above, or can be specifically designed (e.g., an ASIC) and/or programmed for the functionality of the interface device 20. As with the processor 12 of the processor system 10, the processor 22 of the interface device 20, can include a variety of sub-processors, which can, for example, be used in parallel.

As discussed above, the interface device 20 includes a haptic device 24, which is used to provide tactile or haptic feedback to a user of the interface device 20. According to an embodiment of the invention, haptic feedback can be provided by way of a physical object, such as a housing, a manipulandum, or the like. The haptic device 24 can take a variety of forms, including one or more haptic devices that each have multiple operational modes associated with multiple corresponding frequency ranges. Some examples of haptic device 24 configurations that can be used in accordance with one or more embodiments of the invention will be described in greater detail below. The examples of haptic devices 24 given below, however, are not intended to form an exhaustive list of all types of haptic devices 24 that can be included in the interface device 20 but are intended instead as examples only.

The sensor 26 of the interface device 20 is configured to sense input from a user of the interface device 20. For example, the sensor 26 can be used to sense manipulation or movement of a physical object, such as a manipulandum, of the interface device 20. The sensor 26 can also be used to sense other forms of user input, such as pressure, speed, acceleration, torque, light, or other measurable quantities. For example, the sensor 26 can incorporate a piezoelectric sensor to sense pressure, an inertial measurement unit (IMU), such as an accelerometer, to sense various forms of motion, a photovoltaic sensor to sense changes in light levels, and/or other sensors. The sensor 26 can also sense other input, such as feedback (e.g., state information including position and/or velocity) from the haptic device 24, for example.

As shown in FIG. 1, the various components of the interface device 20 are in communication with one another and with the components of the processor system 10 (via the I/O components 16, 16A). The processor 22 of the interface device 20, for example, can be used to control the haptic device 24 based on information received from the sensor 26. Similarly, the processor 12 of the processor system 10 can be used to control the haptic device 24 of the interface device 20 based on information received from the sensor 26 of the interface device 20; in such an embodiment, the processor 22 need not be present. Alternatively, the processor 12 of the processor system 10 (also referred to as a "host processor") can be used in concert with the processor 22 of the interface device 20 (also referred to as a "local processor") both to interpret data received from the sensor 26 and to control the haptic device 24.

The processor system 10 and the interface device 20 can optionally make use of one or more controllers 30a, 30b, 30c, 30d (which can be referred to hereinafter as a controller 30, collectively, individually, or as a subset). As shown in FIG. 1, a controller 30 can exist within the processor 12 (e.g., in the form of a control algorithm) of the processor system 10 and/or the processor 22 of the interface device 20. Additionally, a controller 30 can be a separate component connected to the other components of the processor system 10 and/or the interface device 20 via a bus or other suitable connection. It should be recognized that, according to one or more embodiments, the interface device 20 can function independently of the processor system 10, as it has its own processor and/or controller 30c, 30d, and may not require a processor system 10 at all. For example, the interface device 20 can be a stand-alone device such as a personal digital assistant (PDA) or a cellular telephone, which may or may not be configured to connect to a processor system 10.

FIG. 2A is a diagram illustrating a haptic device, a controller, and a sensor, according to an embodiment of the invention. FIG. 2A also shows different data values provided to the system. The elements shown in FIG. 2A can be used with the processor system 10 and the interface device 20, or with the interface device 20 alone.

As shown in FIG. 2A, user input 28 can optionally be provided (e.g., via the user interface device 20 shown in FIG. 1), and received by an optional sensor 26. The user input 28 can also optionally be provided directly to a controller 30 (e.g., by way of the sensor 26, or some other devices configured to accept and convey user input). The sensor 26 can also optionally receive information from the haptic device 24. For example, the sensor 26 can sense the actual movements of the haptic device 24, thereby sensing the tactile or haptic feedback output by the haptic device 24.

According to an arrangement of the system shown in FIG. 2A, the controller 30 can optionally receive data from the sensor 26, and can optionally receive user input 28 and control parameters 32. Based on the any data received from the sensor 26, any received user input 28, and/or any received control parameters 32, the controller 30 controls the tactile output or haptic feedback of the haptic device 24. For example, the controller 30 (or control algorithm when so implemented) can be used to implement a feedback algorithm, controlling the haptic device 24 based on feedback received from the haptic device 24. The controller controls the output of the haptic device 24 by a control signal that the controller 30 outputs to the haptic device 24.

The control signal output by the controller 30 can be based on a number of parameters, including, for example, control parameters 32. For example, control parameters 32 and other parameters that are used by the controller 30 to control the haptic device 24 can be stored in the memory component 14 of the processor system 10, or by another suitable memory component (e.g., a memory component of the interface device 20). According to one or more embodiments of the invention, the control parameters 32 can include input from a portable electronic device and/or a gaming system. For example, the control parameters 32 can include input from a gaming system, a portable gaming device, a cellular telephone, or the like. According to one or more embodiments of the invention, the controller 30 receives control parameters 32 (e.g., gaming device input, cellular telephone input, etc.), and does not include a sensor 26. According to such embodiments, user input 28 can optionally be received directly by the controller 30, or can be omitted entirely, depending upon the desired function of the system in which the controller 30 is used.

According to one or more embodiments of the invention, the system shown in FIG. 2A can be used in a stand-alone device, such as a cellular telephone, portable electronic device (e.g., a PDA, etc.), or other device. In a cellular telephone embodiment, for example, feedback can be provided in the form of haptic sensations via the haptic device 24 in response to status events (e.g., a message received signal, a network indicator signal, etc.), user input (e.g., mode changes, keypad dialing, option selections, etc.), incoming calls, or other events. Alternatively, the system shown in FIG. 2A can be used in a configuration, such as the configuration shown in FIG. 1, where an interface device 20 can be connected to a processor system 10.

Figure 2B:
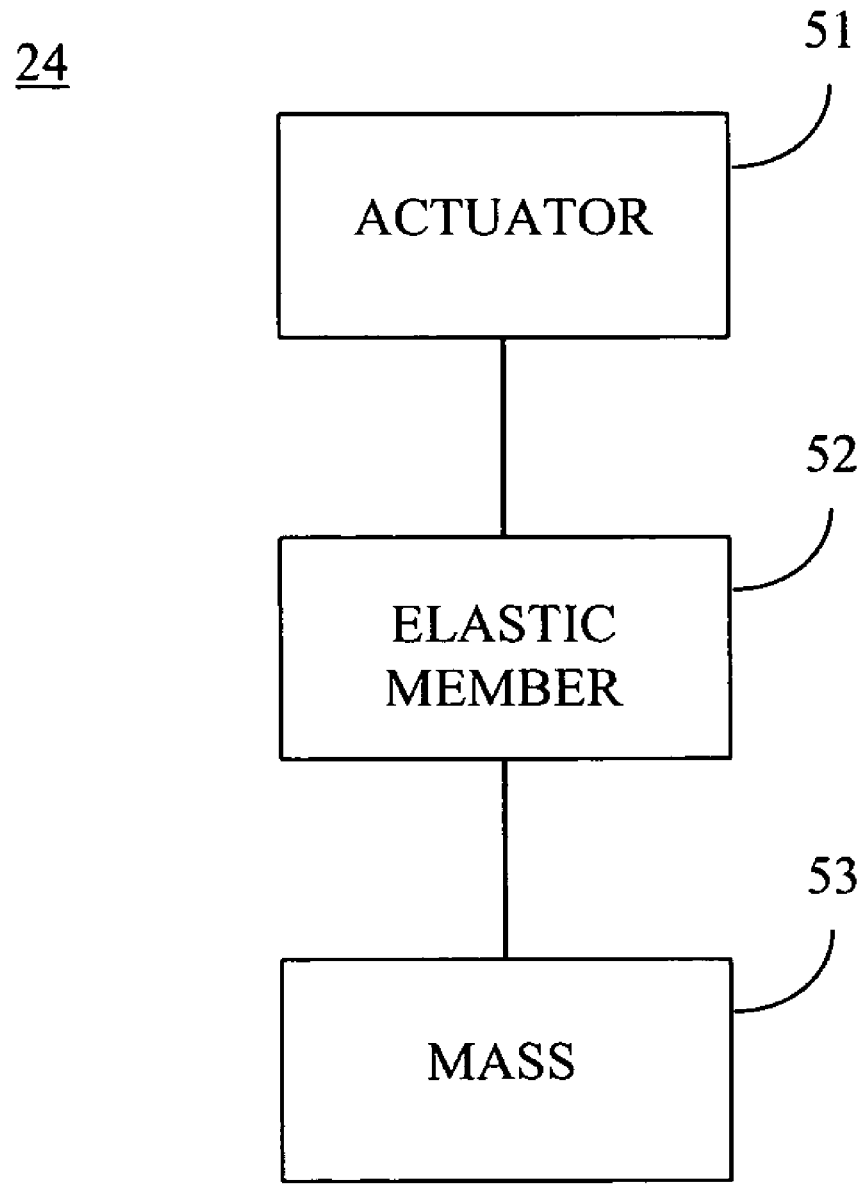
FIG. 2B is a block diagram of a haptic device, according to an embodiment of the invention.

FIG. 2B is a block diagram of a haptic device 24 shown in FIGS. 1 and 2A. As shown in FIG. 2B, the haptic device 24 includes an actuator 51, an elastic member 52 and a mass 53. The haptic device 24 is configured to provide haptic feedback. The actuator 51 is operably connected to the elastic member 52, and the elastic member 52 is operably connected to the mass 53. In operation, the actuator provides force to the elastic member 52. Some of the force applied to the elastic member 52 is translated to the mass 53, and causes the mass 53 to move. By causing the mass 53 to move, haptic forces are provided to a user. Note that the configuration shown in FIG. 2B is only one example of a configuration of a haptic device 24. Other configurations that vary from the configuration shown in FIG. 2B can be used as the haptic device 24. For example, the elastic member 52 can be coupled to the mass 53 by a flexible coupling; the elastic member 52 can be coupled to the actuator 51 by a flexible coupling. In alternative embodiment, the elastic member can be coupled between actuator and a mechanical ground, and the actuator can be directed coupled to the actuator.

Figure 3A:
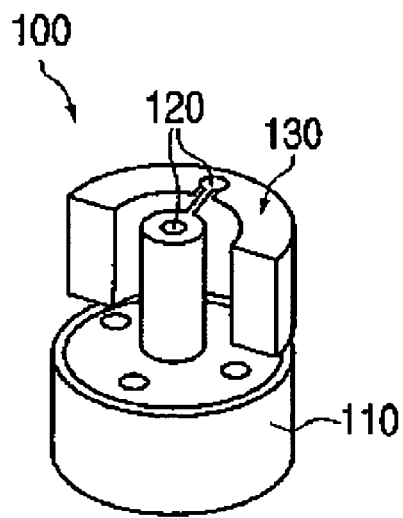
FIG. 3A is a perspective view of a haptic device, according to an embodiment of the invention.
Figure 3B:
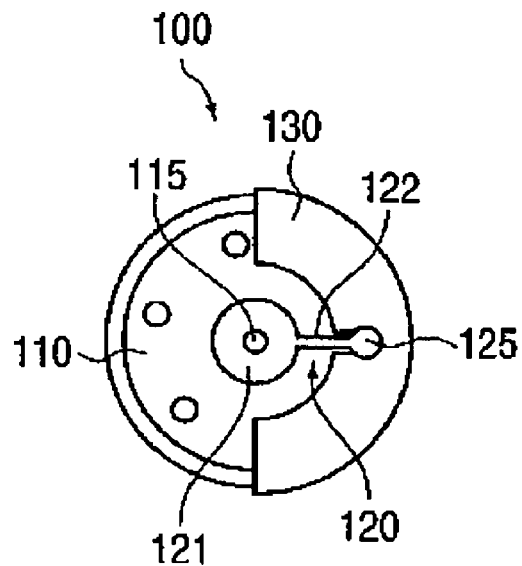
FIG. 3B is a cross-sectional view of the haptic device shown in FIG. 3A.

FIG. 3A is a perspective view of a haptic device, according to an embodiment of the invention, and FIG. 3B is a cross-sectional view of the haptic device shown in FIG. 3A. As shown in FIGS. 3A and 3B, the haptic device 100 includes an actuator 110, an elastic member 120 and a mass 130. The haptic device 100 is configured to provide haptic feedback. As with the haptic devices described below, the haptic device 100 shown in FIGS. 3A and 3B can be used as the haptic device 24 shown in FIGS. 1 and 2 within an interface device 20.

The actuator 110 of the haptic device 100 is a rotary actuator and includes a shaft 115. The elastic member 120 includes a proximate portion 121, a compliant portion 122 and a distal portion 125. The proximate portion 121 of the elastic member 120 is coupled to the shaft 115 of the actuator 110. The distal portion 125, which has a width greater than the compliant portion 122, is coupled to the mass 130.

The actuator 110 can be any type of rotary actuator such as, for example, a direct current (DC) motor, voice coil actuator or a moving magnet actuator. In addition, actuator 110 can be disposed in and mechanically grounded to a device housing (not shown), such as the interface device 20 described above (e.g., a game controller housing, etc.). Examples of haptic devices disposed in and mechanically grounded to game controller housings are disclosed in U.S. application Ser. No. 09/967,494, filed on Sep. 27, 2001, entitled, "Actuator for Providing Tactile Sensations and Device for Directional Tactile Sensations," and Ser. No. 09/968,725, filed on Sep. 28, 2001, entitled, "Directional Inertial Tactile Feedback Using Rotating Masses," the disclosures of which are incorporated herein by reference.

Although the elastic member 120 is shown as being integrally formed in a unitary construction among the proximate portion 121, compliant portion 122 and distal portion 125, other configurations are possible. Where the compliant portion 122 is made of a flexible material, the proximate portion and the distal portion 125 need not be made of flexible materials and need not be integrally formed with the compliant portion 122. For example, the compliant portion 122 of an elastic member can be coupled to the mass 130 and/or the shaft 115 of the actuator 110 by separate couplings or fasteners. Similarly, the elastic member 120 can be of various types including, for example, leaf springs, helical springs, and so forth.

The actuator 110, the elastic member 120 and the mass 130 of the haptic device 100 collectively have a first operational mode associated with a range of frequencies and a second operational mode associated with a range of frequencies different from the range of frequencies associated with the first operational mode. For example, the first operational mode can be based on a unidirectional rotation of the mass 130 about the shaft 115 of the actuator 110 (also referred to herein as the "unidirectional mode"); the second mode can be based on a harmonic motion of the mass 130 (also referred to herein as the "harmonic mode"). The range of frequencies associated with the first operational mode can, optionally, overlap with the range of frequencies associated with the second operational mode.

More specifically, the elastic member 120 coupled between the shaft 115 of the actuator 110 and the mass 130 results in a harmonic system. Such a harmonic system exhibits second order behavior with the magnification of vibrations at certain frequencies (e.g., at a resonance frequency of the mechanical system). Here, the haptic device 100 is configured as a harmonic system where the elastic member 120 stores energy and releases it while in the harmonic mode. For example, the compliant portion 122 of the elastic member 120 can store energy during the movement of the mass 130 in response to one polarity of an alternating current (AC) drive signal and can release the energy during the movement of the mass 130 in response to the other polarity of the AC drive signal. This results in harmonic motion and corresponding amplification through broad resonance, which results in high magnitude vibrations and other effects in a power-efficient manner. In addition, complex AC drive signals having many different frequency components can be combined (e.g., superimposed, combined by a vectored or non-vectored operation, etc.) on each other while the haptic device 100 operates in the harmonic mode. The controller 30 described above in connection with FIG. 2A provides these complex AC drive signals.

The inventors have recognized that it is advantageous for the damping factor of the mechanical system to be low. This may result in a more efficient harmonic vibration. Consequently, the compliant portion 122 of the elastic member 120 can be made of polypropylene, which exhibits a low damping. Alternatively, the elastic member can be made of steel, wire, plastic or other similar types of materials that can connect the mass 130 in series with the shaft 115 of the actuator 110.

When operating in the unidirectional mode, the actuator 110 can be driven, for example, with a DC current, thereby causing the mass 130 to rotate about the shaft 115 of the actuator 110 with centripetal acceleration. This centripetal acceleration provides strong inertial forces against the device housing. Firmware or software techniques can be used to control the magnitude of the vibrations while operating in the unidirectional mode. For example, a certain pulse-repetition rate having a 50% duty cycle results in mass 130 rotating unidirectionally at a certain rate with approximately half of the vibration magnitude that would otherwise result from applying a constant voltage (i.e., 100% duty cycle). Although the relationship between the duty cycle and the vibration magnitude may not be linear, it can be approximated as linear over certain operational ranges for the sake of convenience. Further examples of such firmware are disclosed in U.S. application Ser. No. 09/669,029, filed on Sep. 27, 2000, entitled, "Controlling Haptic Sensations for Vibrotactile Feedback," the disclosure of which is incorporated herein by reference.

When the actuator 110 is operated in the harmonic mode, the mass 130 oscillates at or approximately at the frequency of the drive signal (e.g., an AC signal driving the actuator 110). Such a drive signal can be produced, for example, by an H-bridge circuit or other amplifier. An example of an H-bridge amplifier that can be used to produce such a drive signal is disclosed in U.S. application Ser. No. 10/000,662, filed on Oct. 31, 2001, now U.S. Pat. No. 6,683,437, entitled, "Current Controlled Motor Amplifier System," the disclosure of which is incorporated herein. Using such a signal advantageously involves smaller time delays in starting and stopping movement of the mass 130 and in achieving peak or maximum acceleration than is the case with motion of the mass in the unidirectional mode. Additionally, other techniques may be employed to reduce time delays associated with starting and stopping movement of the mass 130, as will be described below in greater detail, such as providing a lead-in or ending current pulse as part of a control signal, for example.

Figure 4A:
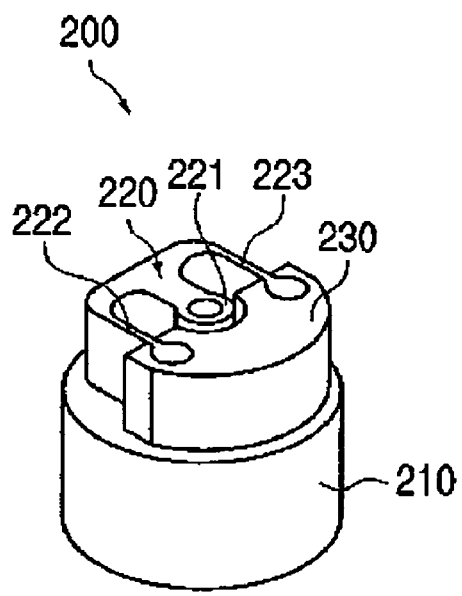
FIG. 4A is a perspective view of a haptic device, according to an embodiment of the invention.
Figure 4B:
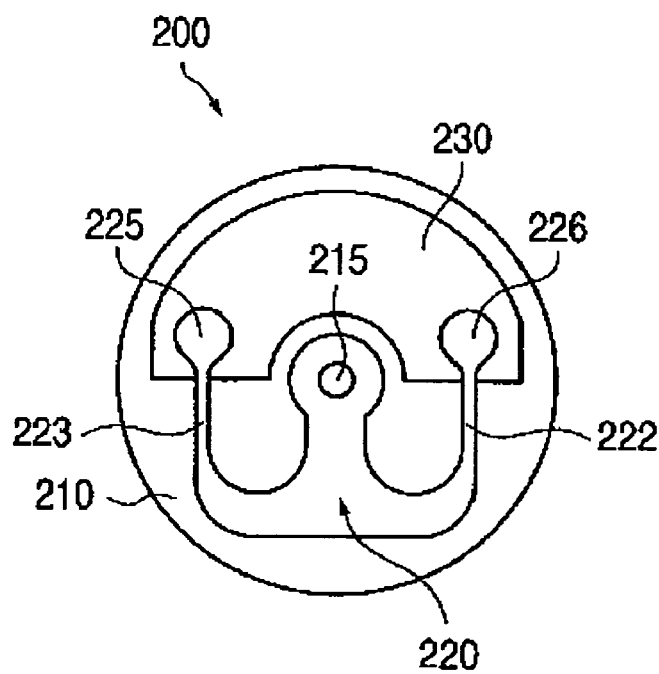
FIG. 4B is a cross-sectional view of the haptic device shown in FIG. 4A.

FIG. 4A is a perspective view of a haptic device, according to another embodiment of the invention, and FIG. 4B is a cross-sectional view of the haptic device shown in FIG. 4A. Unlike FIGS. 3A and 3B, which show an elastic member having a single compliant portion, alternative embodiments having an elastic member with multiple compliant portions are possible, such as the haptic device 200 shown in FIGS. 4A and 4B, which has two compliant portions. This haptic device 200 can be used as the haptic device 24 of the interface device 20 shown in FIG. 1. The haptic device 200 includes an actuator 210, an elastic member 220, and a mass 230. The actuator 210, which is a rotary actuator, includes a shaft 215. The elastic member 220 includes a proximate portion 221, multiple compliant portions 222, 223, and multiple corresponding distal portions 225, 226. The proximate portion 221 of the elastic member 220 is coupled to the shaft 215 of the actuator 210. The distal portions 225, 226 each have a width greater than their respective compliant portions 222, 223 and are coupled to the mass 230. Although the elastic member 220 shown in FIGS. 4A and 4B has two compliant portions 222, 223, other embodiments are possible where the elastic member has more than two compliant portions.

Note that the compliant portion(s) of a rotating mass can be compliant in one degree of freedom or axis of travel of the mass, but need not be compliant in the remaining degrees of freedom. For example, the compliant portion 122 shown in FIGS. 3A and 3B can be inflexible in the direction parallel to the axis of rotation along the shaft 115 of the actuator 110. Similarly, the compliant portions 222, 223 shown in FIGS. 4A and 4B can each be inflexible in the direction parallel to the axis of rotation along the shaft 215 of the actuator 210. As best shown in 4A, the compliant portions 222, 223 can be relatively thick along the direction parallel to the shaft 215 of the actuator 210. Additionally, the elasticity of the various compliant portions can be varied according to torsional or other characteristics.

Figure 5:
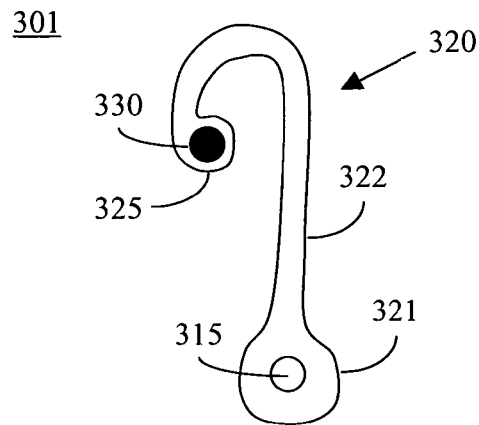
FIG. 5 shows a top view of a portion of a haptic device, according to an embodiment of the invention.
Figure 6:
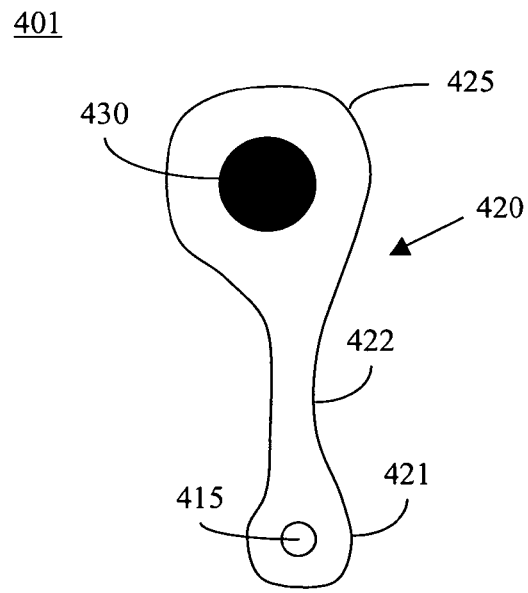
FIG. 6 shows a top view of a portion of a haptic device, according to an embodiment of the invention.
Figure 7:
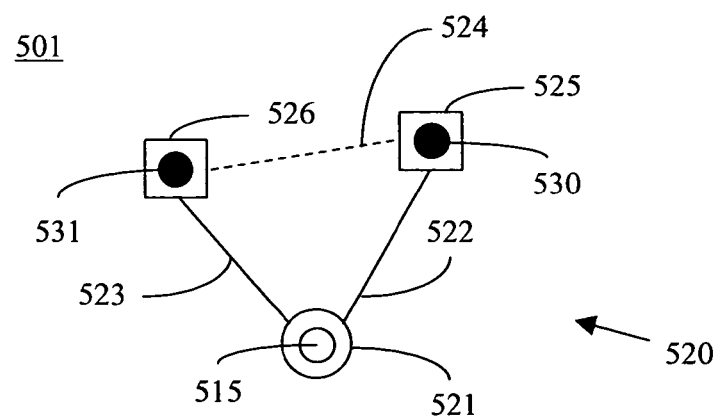
FIG. 7 shows a top view of a portion of a haptic device, according to an embodiment of the invention.

FIGS. 5-7 each show a top view of a portion of a haptic device in accordance with other embodiments of the invention. When in operation, the mass(es) for each haptic device rotate(s) about the shaft of the actuator. Each of the portions of haptic devices shown in these figures can be used either in a unidirectional mode, a harmonic mode, or a superposition mode that combines the unidirectional mode and the harmonic mode. Thus, each portion of a haptic device shown in FIGS. 5-7 has multiple operational modes that can be controlled by way of one or more embodiments of the invention. Each portion of a haptic device shown in FIGS. 5-7 can also be used as part of the haptic device 24 of FIG. 1.

FIG. 5 shows top view of a portion of a haptic device, according to an embodiment of the invention. The portion 301 of a haptic device in FIG. 5 includes an elastic member 320, which is similar to the elastic members 120, 220, described above. The elastic member 320 includes a proximate portion 321, a compliant portion 322, and a distal portion 325. The proximate portion 321 is coupled to the shaft 315 of an actuator (not shown). The distal portion 325 is coupled to a mass 330. It will be appreciated that the mass 330, although shown as being integrally encapsulated within the distal portion 325, can also be external to the distal portion 325, according to one or more embodiments of the invention.

The elastic member 320 shown in FIG. 5 can be used in a unidirectional operational mode (e.g., by applying a DC or other low-frequency drive signal), or in a harmonic operational mode (e.g., by applying an AC drive signal). Additionally, because the elastic member 320 is asymmetric, it exhibits different characteristics depending on which direction it is rotated. Thus, in addition to potentially exhibiting one of multiple operational modes depending upon the drive signal, different operational modes can be achieved by rotating the elastic member 320 in a different direction. Moreover, portion 301 of the haptic device shown in FIG. 5 can provide advantageously a variable moment, which substantially decouples the amplitude and the frequency of haptic sensations produced thereby. More specifically, as the velocity with which the portion 301 is rotated increases, the compliant portion 322 flexes, and the radial distance between the mass 330 and the center of rotation (e.g., the shaft 315) varies. For example, according to an embodiment, the mass 330 moves closer to the shaft 315 as the rotation velocity of the portion 301 increases, thereby changing the moment of the portion 301.

FIG. 6 shows a top view of a portion of a haptic device, according to another embodiment of the invention. The portion 401 of the haptic device in FIG. 6 includes an elastic member 420, which is similar to the elastic members 120, 220, 320, described above. The elastic member 420 includes a proximate portion 421, a compliant portion 422, and a distal portion 425. The proximate portion 421 is coupled to the shaft 415 of an actuator (not shown). The distal portion 425 is coupled to a mass 430. It will be appreciated that the mass 430, although shown as being integrally encapsulated within the distal portion 425, can also be external to the distal portion 425, according to one or more embodiments of the invention.

The elastic member 420 shown in FIG. 6 can be used in a unidirectional operational mode (e.g., by applying a DC or other low-frequency drive signal), or in a harmonic operational mode (e.g., by applying an AC drive signal). Additionally, as with the elastic member 320 shown in FIG. 5, the elastic member 420 of FIG. 6 is asymmetric, and therefore, exhibits different characteristics depending on which direction it is rotated. Thus, in addition to potentially exhibiting one of multiple operational modes depending upon the drive signal, different operational modes can be achieved by rotating the elastic member 420 in a different direction.

FIG. 7 shows a top view of a portion of a haptic device, according to an embodiment of the invention. The portion 501 of a haptic device in FIG. 7 includes an elastic member 520, which is similar to the elastic members 120, 220, 320, 420, described above. The elastic member 520 includes a proximate portion 521, two compliant portions 522, 523, and two distal portions 525, 526. The proximate portion 521 is coupled to the shaft 515 of an actuator (not shown). The distal portions 525, 526 are coupled to two masses 530, 532, respectively. It will be appreciated that the masses 530, 531, although shown as being integrally contained within the distal portions 525, 526, can also be external to the distal portions 525, 526, according to one or more embodiments of the invention.

The elastic member 520 shown in FIG. 7 can be used in a unidirectional operational mode (e.g., by applying a DC or other low-frequency drive signal), in a harmonic operational mode (e.g., by applying an AC drive signal) or an operation mode being the superposition of the unidirectional mode and the harmonic mode. Additionally, because the elastic member 520 is asymmetric, it exhibits different characteristics depending on which direction it is rotated. This asymmetry of the elastic member 520 can be further accentuated by using differently weighted masses 530, 531. Thus, in addition to potentially exhibiting one of multiple operational modes depending upon the drive signal, different operational modes can be achieved by rotating the elastic member 520 in a different direction.

The portion 501 of the haptic device can also provide a variable moment, which decouples the magnitude and frequency of haptic sensations provided thereby. More specifically, the compliant portions 522, 523 can be formed in such a way to allow the distance between the masses 530, 531 to vary as the rotational velocity and/or the direction of rotation of the portion 501 is varied. For example, according to one embodiment of the invention, a compliant member 524 (e.g., a spring) can optionally be connected between the two distal portions 525, 526. This additional compliant member 524 (shown in FIG. 7 by a dashed line) can cause the distal portions 525, 526 (and the corresponding masses 530, 531) to move closer together when the portion 501 is rotated in one direction, causing the portion 501 to exhibit a low-frequency eccentric-mass response. When the portion 501 is rotated in the opposite direction, however, the distal portions 525, 526 (and the corresponding masses 530, 531) move farther apart, causing the portion 501 to exhibit a higher-frequency eccentric-mass response. These two eccentric-mass responses can be used in addition to the unidirectional or harmonic modes described above to control haptic sensations provided by way of a haptic device. Thus, for example, the portion 501 can produce a multi-modal response as well as a variable-moment response.

According to one or more embodiments of the invention, the compliant portions 522, 523 of the elastic member 520 are different lengths and/or made from different materials. For example, materials having different flexibilities or spring constants can be used to form each of the compliant portions 522, 523. Additionally, each of the compliant portions 522, 523 can be formed to have different harmonic responses. For example, each of the compliant portions 522, 523 can exhibit harmonic responses to different resonant frequencies or frequency ranges. Additionally, each of the compliant portions 522, 523 can exhibit different responses in each direction or angle of rotation. Thus, depending upon the specific construction of the elastic member 520, several harmonic responses and/or several operational modes of the elastic member 520 can be obtained.

According to an embodiment of the invention, a haptic device, such as the haptic device 24 shown in FIG. 1, for example, includes a variable-stiffness compliant portion of a compliant member. If the spring constant (K) value of a compliant portion of an elastic member can be varied as a function of drive frequency, then the haptic device can operate near a peak magnitude and efficiency across a relatively wide range of frequencies. A mechanical actuator can be, for example, a piezoelectric structure (e.g., a piezoelectric buzzer). Such a piezoelectric structure can include, for example, a ceramic on a mass where an applied voltage causes movement of the ceramic. Through proper selection of the applied voltage, the ceramic can behave in a manner similar to a spring. The piezoelectric structure can change its spring constant as a function of bias voltage. Consequently, a frequency-to-voltage converter driving the piezoelectric structure can maintain a resonance frequency of haptic device by adjusting the spring constant.

The behavior of an embodiment of the haptic device having a unidirectional mode and a harmonic mode (e.g., the haptic device 100 shown in FIGS. 3A and 3B, the haptic device 200 shown in FIGS. 4A and 4B, and haptic devices using the rotating masses shown in FIGS. 5-7) can be modeled. Such a model can be based on various factors such as, for example, the mass shape and weight distribution, and the stiffness of the compliant portion of the elastic member. The following provides a dynamics model of an embodiment of the haptic device having a unidirectional mode and a harmonic mode.

Equation 1 below is based on a second order Laplace transform function, and can be used to model the harmonic mode of a haptic device, such as the haptic devices discussed above, for example, which are capable of using a rotating mass.

$$\frac{X}{T_m} = \frac{1}{r(ms^2 + bs + k)} \quad (1)$$

In Equation 1 above, X is displacement of the mass of a haptic device, $T_m$ is the torque of an actuator driving the haptic device (e.g., a motor), m is the weight of the mass, r is the eccentricity radius, k is the spring constant, b is the damping constant, and s is the Laplace variable. The eccentricity radius r is the distance from center of an actuator shaft to "center of mass" of the mass being driven by the actuator of the haptic device.

Equation 2, shown below, can be used to model the unidirectional mode of a haptic device, such as the haptic devices discussed above, for example, which are capable of using a rotating mass.

$$F = r\omega^2 m \qquad (2)$$

In Equation 2 above, F is the force, w is the angular velocity of the mass of the haptic device (e.g., 2πf, where f is the frequency of the mass of the haptic device).

Equation 3 below shows a damping ratio d that can be used to model damping of a haptic device, such as the haptic devices discussed above, for example, which are capable of using a rotating mass.

$$d = \frac{b}{2\sqrt{k}} \qquad (3)$$

In Equation 3 above, d is the damping ratio that relates the damping constant b to the spring constant k.

The dynamics model defined above in connection with Equations 1-3 can be used to design a haptic device having a harmonic mode. For example, the specific values of the damping ratio d, the spring constant k, the weight of the mass m, and the eccentricity radius r can be selected to achieve a particular behavior of a haptic device. Ways in which the dynamics model, defined above using Equations 1-3 can be used to achieve a particular behavior of a haptic device is described in greater detail in U.S. application Ser. No. 10/301,809, filed on Nov. 22, 2002, entitled, "Haptic Feedback Using Rotary Harmonic Moving Mass," incorporated by reference above.

As described above, a multi-mode haptic device is capable of providing effects using both a unidirectional operational mode and a harmonic operational mode. According to one or more embodiments of the invention, the unidirectional operational mode provides strong, attention-getting signals y, and the harmonic operational mode, on the other hand, is used to convey subtler sensations than those generally associated with the unidirectional operational mode. In addition to a DC signal, one or more embodiments of the invention can use a low frequency AC signal can drive a haptic device in the unidirectional operational mode because it has non-zero values for sufficiently long periods of time.

Figure 8:
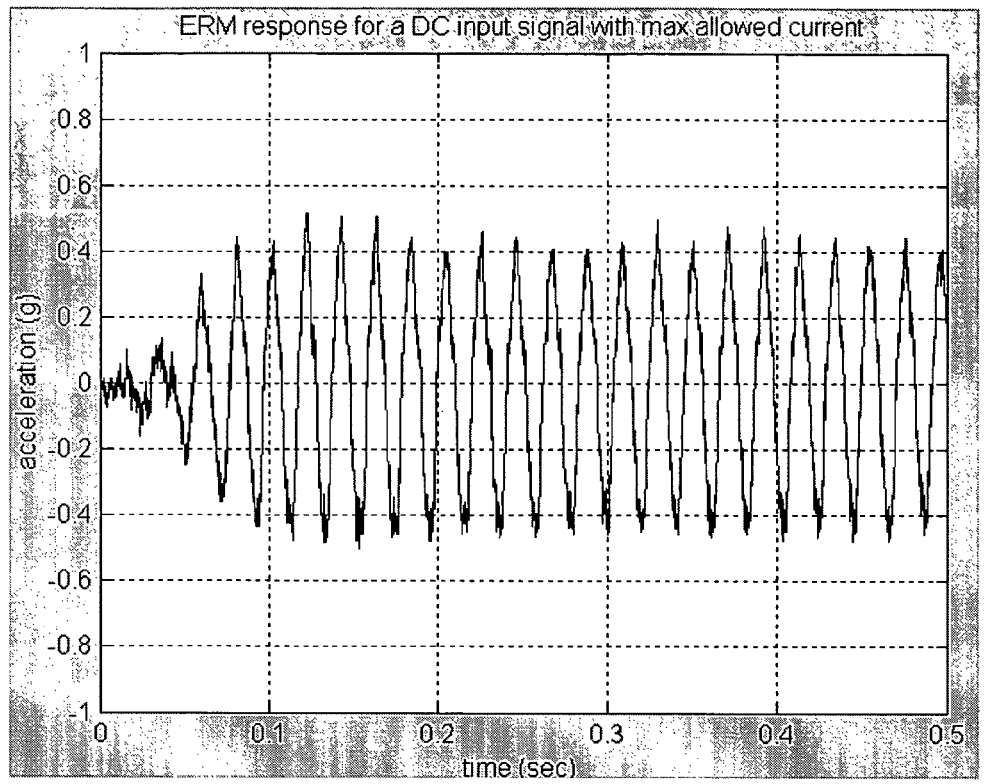
FIG. 8 is a plot showing an acceleration-versus-time response of a haptic device, according to an embodiment of the invention.

FIG. 8 is a plot showing an acceleration-versus-time response of a haptic device, according to an embodiment of the invention. The response shown in FIG. 8 is a low-frequency rumble response obtained by applying a DC drive signal to the haptic device. Or, in other words, the response shown in FIG. 8 is the response of a haptic device being driven in a unidirectional operational mode.

Figure 9:
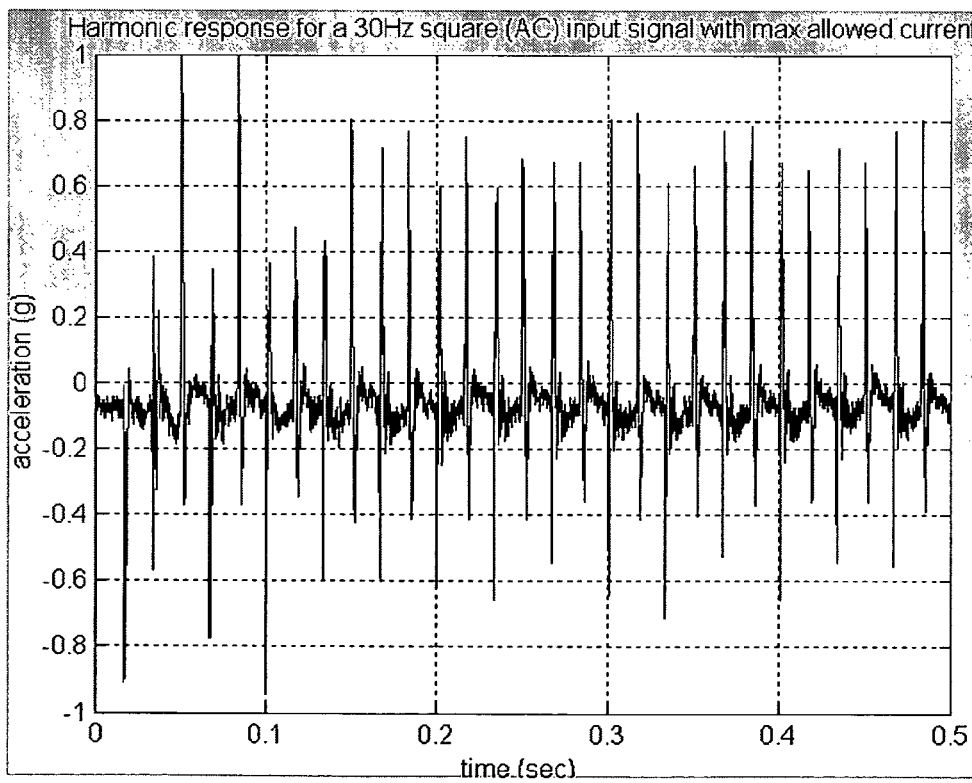
FIG. 9 is a plot showing an acceleration-versus-time response of a haptic device, according to an embodiment of the invention.

FIG. 9 is a plot showing an acceleration-versus-time response of a haptic device, according to an embodiment of the invention. The response shown in FIG. 9 is obtained by applying an AC drive signal in the form of a periodic square wave having a frequency of approximately 30 Hz. The magnitude and frequency of the response can be decoupled and can be independently varied as will be described in greater detail below. The response shown in FIG. 9 can, for example, result from direction reversals caused by the applied periodic square-wave or rectangular-wave signal. According to one or more embodiments of the invention, any physical compliance of the haptic device can cause a recoil, which can contribute to the response shown in FIG. 9, increasing the size of the acceleration peaks. As discussed above, for rotating masses in an asymmetric device, the compliance may change the moment of the device depending upon the direction the device is rotated.

Figure 10:
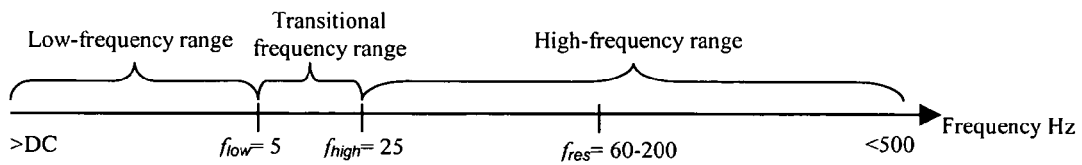
FIG. 10 is a plot showing drive-signal frequency ranges of a multi-mode haptic device, according to an embodiment of the invention.

FIG. 10 is a plot showing an example of drive-signal frequency ranges of a multi-mode haptic device, according to an embodiment of the invention. More specifically, the frequency ranges shown in FIG. 10 are ranges of drive-signal frequencies used to drive a bi-modal haptic device having a first mode that corresponds to the low-frequency range and a second mode that corresponds to a high-frequency range. The principles shown in the plot of FIG. 10 can be generalized, however, to multi-modal haptic devices having more that two modes, which would have similar, multiple frequency ranges corresponding to each of the device's multiple modes, and a transitional frequency range between each of those multiple frequency ranges.

In the example shown in FIG. 10, a low-frequency response is caused by drive signals within the low-frequency range, which can extend, for example, from approximately DC (i.e., 0 Hz) to a low-frequency limit $f_{low}$ of approximately 5 Hz. A transitional frequency response is caused by drive signals within the transitional-frequency range, which can extend, for example, from the low-frequency limit $f_{low}$ to a high-frequency limit $f_{high}$ of approximately 25 Hz. A high-frequency response is caused by drive signals within the high-frequency range, which can extend, for example, from the high-frequency limit $f_{high}$ to all higher frequencies (e.g., all frequencies capable of being output by the device). A resonant-frequency $f_{res}$ response, which depends upon the physical characteristics of the haptic device, is achieved by a drive signal having a frequency located in this example within the high-frequency range. For example, the resonant-frequency $f_{res}$ response can be achieved by using drive signals having frequencies between about 60 Hz-200 Hz. The drive signals used to achieve this resonant-frequency $f_{res}$ response can vary according to design constraints and desired performance of the haptic device.

The high end of the unidirectional operational mode of the device is dependent upon characteristics of the actuator used. Thus, the exact frequency where the haptic device ceases to operate in the unidirectional operational mode and begins to operate in the harmonic operational mode can vary from device to device. Accordingly, the transitional frequency range is designed to include frequencies of drive signals at which most actuators transition from operating in a unidirectional operational mode, to operating in a harmonic mode. Thus, the low-frequency range shown in FIG. 10 includes frequencies of drive signals that can cause some haptic devices to operate in the unidirectional operational mode, and the high-frequency range includes frequencies of drive signals that can cause these haptic devices to operate in the harmonic operational mode. Drive signals with frequencies located within the transitional frequency range can be used to provide smooth transitions from a low-frequency, unidirectional operational mode to a high-frequency, harmonic operational mode.

FIGS. 11A-11G are plots showing examples of signals used to drive a haptic device, according to an embodiment of the invention. The signals shown in FIGS. 11A-11G are low-frequency signals used to drive a haptic device within the low-frequency range shown in FIG. 10. These signals are used to convey a strong sensation and a clear beat pattern of the output feedback (i.e., the periodicity of the output feedback) to a user of an interface device, such as the interface device 20 shown in FIG. 1. The signals shown in FIGS. 11A-11G have a period T defined by the relation shown in Equation 4 below.

$$T = \frac{1}{f_{desired}} \quad (4)$$

In Equation 4 above, the desired frequency $f_{desired}$ can be selected based upon the desired performance of the haptic device to which the drive signal is being applied.

According to one or more embodiments of the invention, the desired frequency $f_{desired}$ of the drive signal is equal to the resonant frequency $f_{res}$ of the haptic device to which the signal is being applied. When the resonant frequency $f_{res}$ is used to drive an actuator (e.g., by applying the resonant frequency $f_{res}$ directly, or by applying bursts of the resonant frequency $f_{res}$), acceleration of the mass is maximized, and a low frequency response is emulated. The frequency of a signal, such as a square wave, can be varied to change a user's perception of a frequency of a haptic effect. The duty cycle can be varied to change a user's perception of a magnitude of a haptic effect.

Figure 11:
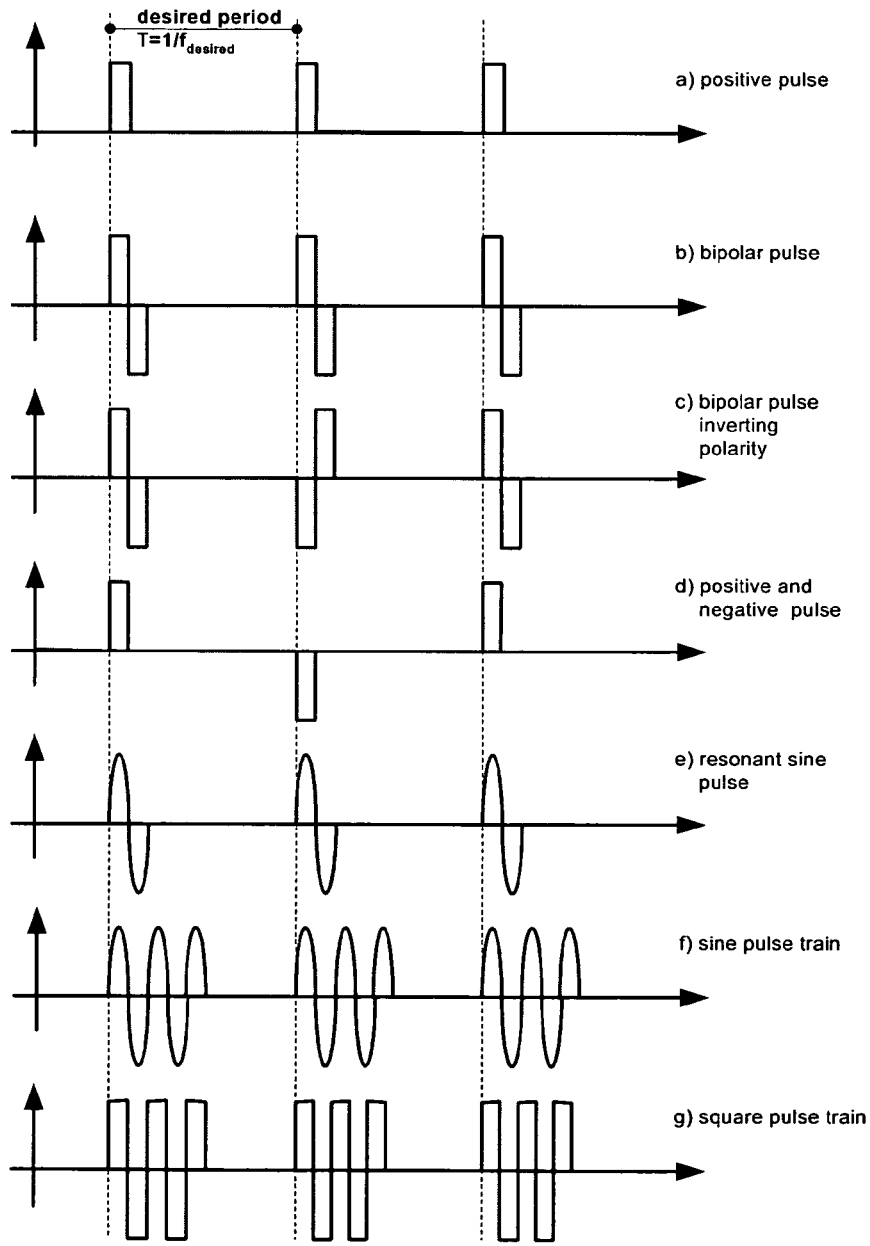
FIGS. 11A-11G are plots showing examples of signals used to drive a haptic device, according to an embodiment of the invention.

FIGS. 11A-11D are forms of rectangular waves. FIG. 11A is a positive pulse; FIG. 11B is a bipolar pulse; FIG. 11C is a bipolar pulse with inverting polarity; and FIG. 11D is a positive and negative pulse. FIG. 11E is a resonant sine pulse and FIG. 11F is a sine pulse train. FIG. 11G is a square pulse train.

In accordance with one or more embodiments of the invention, various duty-cycle-driven control methods for controlling a multi-mode haptic device can be used to determine drive frequencies appropriate for emulating low-frequency haptic feedback responses. Such a duty-cycle-driven control method that can be used in accordance with one or more embodiments of the invention is described in U.S. application Ser. No. 09/669,029, filed on Sep. 27, 2000, entitled, "Controlling Haptic Sensations for Vibrotactile Feedback," and Ser. No. 09/675,995, filed on September 29, now U.S. Pat. No. 6,680,729, entitled, "Increasing Force Transmissiblity for Tactile Feedback Interface Devices," the disclosures of which are incorporated by reference.

According to an embodiment of the invention, a duty-cycle-driven control method can be used to divide a frequency range of a haptic device into two portions: a low-frequency range and a high-frequency range. The actuator of the haptic device can be driven using, for example, the maximum available current and/or voltage. According to one or more embodiments of the invention, a duty-cycle-driven control method operates in the unidirectional operational mode. The magnitude of the periodic haptic feedback is determined by varying the "on-time" of the driving signal's duty cycle.

According to another embodiment of the invention, using a duty-cycle-driven control method, low-frequency haptic feedback, which is the rumble response shown in FIG. 8, can be achieved using a drive signal that has a frequency outside the low-frequency range shown in FIG. 10. The "on-time" $t_{on}$ of the driving signal, according to this embodiment, is long enough such that the desired haptic feedback is produced. The maximum magnitude M of the haptic feedback is accomplished by a drive signal with the maximum on-time $t_{onmax}$. Other magnitudes m of the haptic feedback, which are less than the maximum magnitude M, can be achieved by using an on-time $t_{on}$ that is less than the maximum on-time $t_{onmax}$, and which is defined in the manner shown below in Equation 5.

$$t_{on} = \frac{m}{M} t_{on\ max} \quad (5)$$

According to another embodiment of the invention using a duty-cycle-driven control method, high-frequency haptic feedback can be achieved using an on-time $t_{on}$, which is a percentage P of the desired period T. Thus, according to this embodiment, the maximum magnitude M for the high-frequency haptic feedback is achieved for an on-time ton that is 100-percent of a specific or desired period T. Other magnitudes m of the haptic feedback, which are less than the maximum magnitude M can be calculated in the manner shown below in Equation 6.

$$t_{on} = \frac{mP}{100M} T \quad (6)$$

Figure 12:
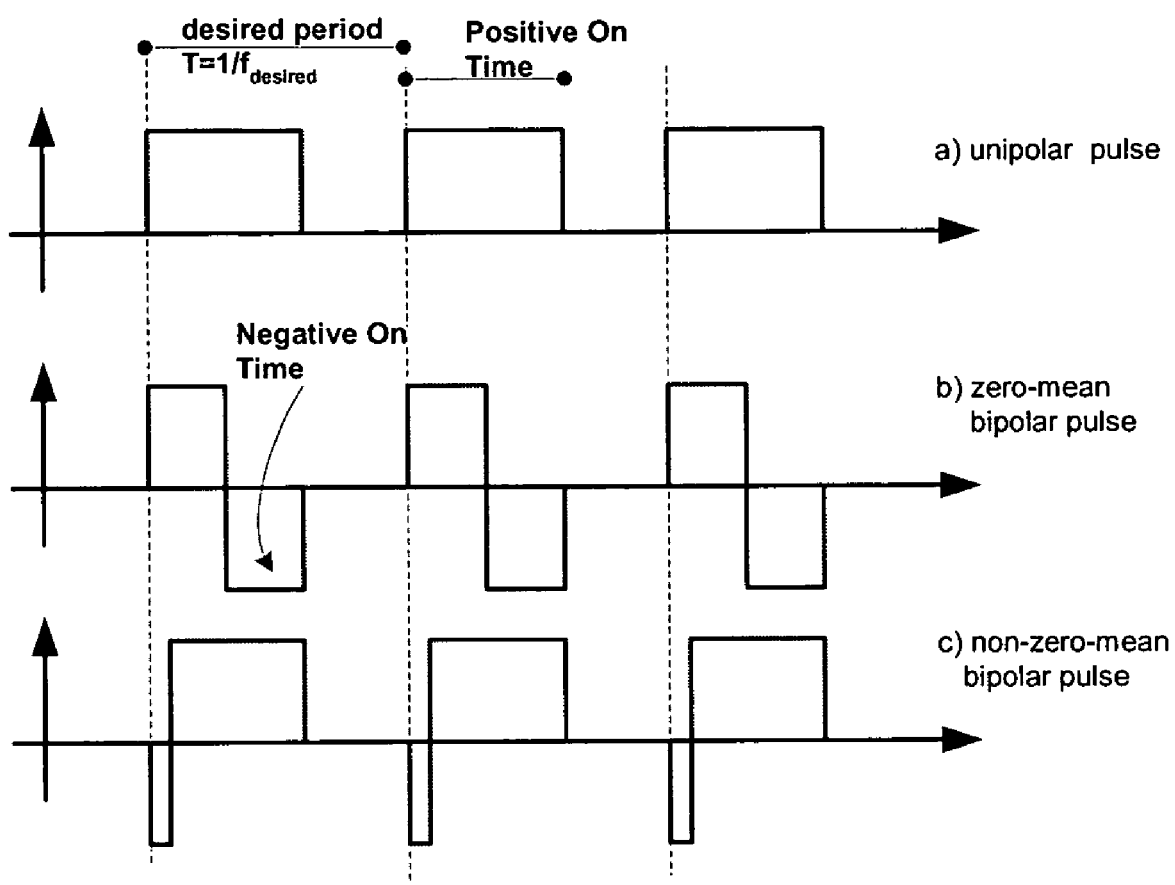
FIGS. 12A-12C are plots showing examples of signals used to drive a haptic device, according to an embodiment of the invention.
Figure 13:
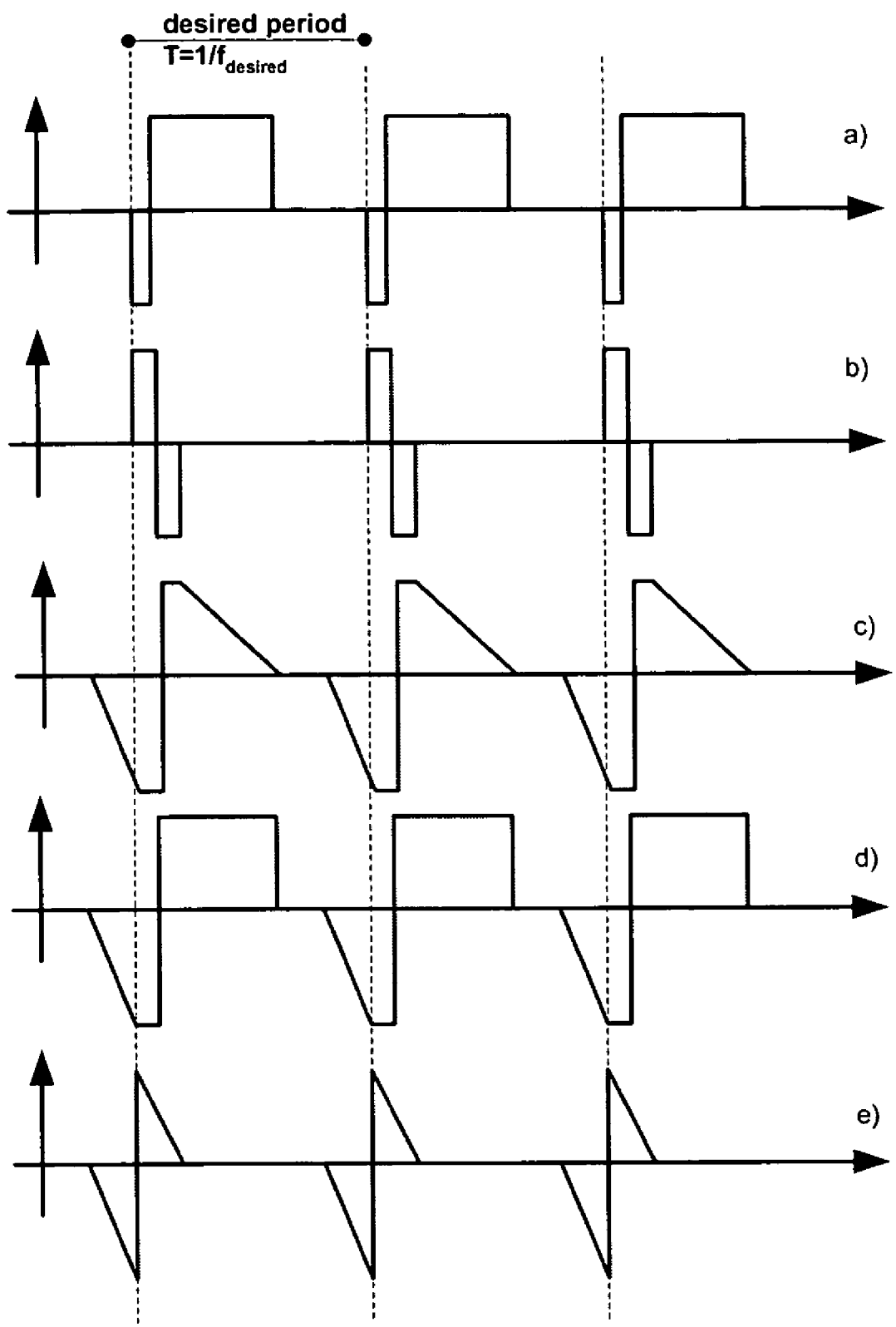
FIGS. 13A-13E are plots showing examples of signals used to drive a haptic device, according to an embodiment of the invention.

FIGS. 12A-12C are plots showing examples of signals used to drive a haptic device, according to an embodiment of the invention. The drive signals shown in FIGS. 12A-12C have frequencies of approximately 20 Hz to 30 Hz. The signal shown in FIG. 12A, for example, is an example of a unipolar pulse appropriate for operation in the unidirectional operational mode. The signal of FIG. 12B is an example of a bipolar pulse with a 50-percent duty cycle appropriate for high-frequency operation, or operation in the harmonic operational mode. The signal of FIG. 12C is an example of a bipolar pulse with a non-fifty-percent duty cycle appropriate for operation in the high-low transition area shown in FIG. 10. The small negative pulse of the signal shown in FIG. 12C can be used to stop the motion of the previous period.

According to one or more embodiments of the invention, the drive signals shown in FIGS. 12A-12C can be used to provide a substantially smooth transitional frequency range from the low-frequency range to the high-frequency range (see, e.g., the transitional frequency range from 5 Hz to 25 Hz shown in FIG. 10). As a drive signal transitions from a low-frequency signal to a high-frequency signal, the positive pulse of a bipolar signal (e.g., the non-zero-mean bipolar-pulse signal shown in FIG. 12C) is reduced gradually until it becomes a zero-mean bipolar-pulse signal (e.g., as shown in FIG. 12B) causing a haptic device to operate in the high-frequency range.

Because the magnitude of the step size from the negative part of the signal to the positive part of the signal in FIGS. 12B and 12C is larger than change from zero to the positive part of the signal, it creates a larger perceived haptic effect magnitude. Power is better conserved, however, by not having a negative on-time, as in FIG. 12A. Thus, where power conservation is more important, the drive signal using a unipolar pulse (e.g., the drive signal shown in FIG. 12A) can be used, and where a larger haptic magnitude is required, a bipolar pulse (e.g., the drive signals shown in FIGS. 12B and 12C) can be used.

FIGS. 13A-13E are plots showing examples of signals used to drive a haptic device, according to another embodiment of the invention. Generally speaking, the signals shown in FIGS. 13B, 13C, and 13E create a beat pattern easily identifiable by a user because the transients of the signal are perceived as a single pulse (e.g., a burst pulse). The signals shown in FIGS. 13A and 13D produce a larger perceived magnitude than the signals of FIGS. 13B, 13C, and 13E, but do not produce a beat pattern as clear as the signals of those Figures in part because of transients associated with those signals. Thus, as demonstrated by the perceived haptic feedback caused by the drive signals of FIGS. 13A-13E, there is a trade-off between perceived strength and perceived beat pattern.

Drive signals providing haptic feedback within the transitional frequency range (see, e.g., FIG. 10) are dependent on the profiles chosen in both the low-frequency and high-frequency ranges of a haptic device. Specifically, to provide a substantially smooth transition between frequency ranges and consistency of magnitudes over an extended frequency spectrum, the proper drive signals within the low-high transition range can be selected, such that the perceived haptic effect in this area appears to be "blended."

Figure 14:
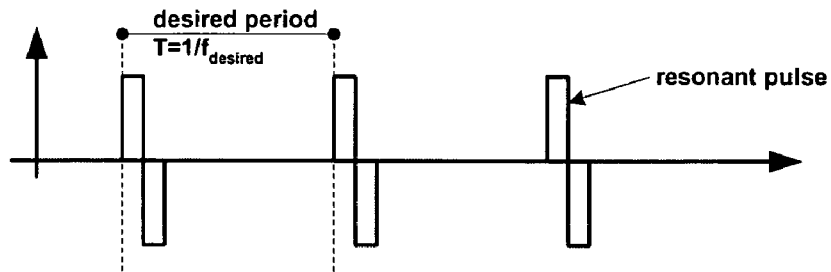
FIG. 14 is a plot showing an example of a signal used to drive a haptic device, according to an embodiment of the invention.

One technique of combining, or "blending," drive signals for a smooth response transition within the transitional frequency range, according to an embodiment of the invention, is to use a resonant pulse, while varying the desired frequency. The signal shown in FIG. 14 is a series of resonant pulses that can be used to generate drive signals having frequencies over the entire functioning frequency range of a haptic device, according to an embodiment of the invention. Drive signals in the low-frequency range can use pulses at a resonant frequency $f_{res}$ spaced at periods T determined by substituting the resonant frequency $f_{res}$ for the desired frequency $f_{desired}$ in Equation 4. This provides a consistent perceived magnitude and frequency pattern over the whole functioning frequency range.

Another technique of blending drive signals for a smooth response transition within the transitional frequency range, according to a embodiment of the invention, is to use a resonant pulse converted to a zero-mean bipolar-pulse periodic signal. Such a signal can be used to provide haptic feedback within the transitional frequency range. The transition drive signal having a zero-mean bipolar-pulse can be derived using a magnitude conversion, a frequency conversion, or duty-cycle-driven control method, among other techniques.

Figure 15:
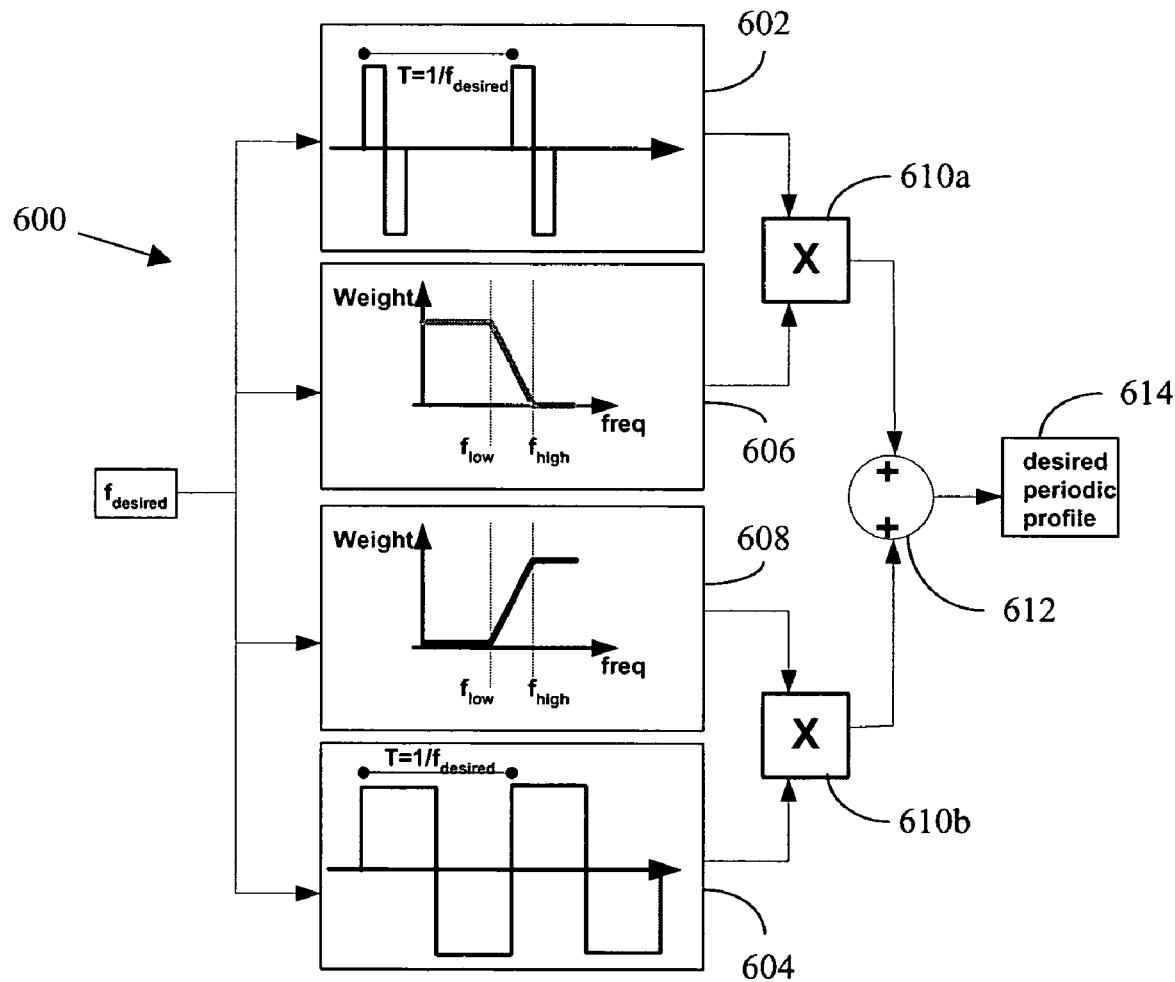
FIG. 15 is a diagram illustrating elements of an embodiment of the invention.

FIG. 15 shows a system 600 for performing magnitude conversion of drive signals according to an embodiment of the invention. A resonant pulse drive signal generator 602 and a bipolar-pulse drive signal generator 604 (e.g., a fifty-percent duty-cycle drive signal generator) produce respective signals computed for the period T in the manner shown in Equation 4. The drive signal produced by each drive signal generator 602, 604 is with a corresponding pre-determined weighting filter 606, 608, by a corresponding multiplier 610a, 610b in the frequency domain. The resulting products are summed by a summer 612 to produce a desired periodic profile 614 for the desired frequency $f_{desired}$.

In other words, the resonant pulse generated by the resonant pulse generator 602 is multiplied in the frequency domain by a first weighting filter 606, which is essentially a low-pass filter. The bipolar-pulse drive signal generated by the bipolar-pulse drive signal generator 604 is multiplied in the frequency domain by a second weighting filter, which is essentially a high-pass filter. Hence, in the resulting signal having the desired periodic profile 614, as can be seen in the frequency profiles of the first weighting filter 606 and the second weighting filter 608, for frequencies from zero to the low-frequency limit $f_{low}$ shown in FIG. 10, the weight of the resonant pulse is one, and the weight of the bipolar-pulse periodic drive signal is zero, respectively. Conversely, at frequencies from the high-frequency limit $f_{high}$ and above, the weight of the resonant pulse is zero and the weight of the bipolar-pulse periodic drive signal is one. In the transitional frequency range shown in FIG. 10, the resonant pulse signal and the bipolar-pulse drive signal are combined in such a manner that the weight of the resonant pulse signal decreases and the weight of the bipolar-pulse drive signal increases, with increased frequency within the transitional frequency range. The resulting desired periodic profile 614 provides a haptic feedback having a well-defined pattern that is "blended" across an extended frequency range.

Another technique for blending haptic feedback responses from the various frequency ranges shown in FIG. 10, according to another embodiment of the invention, is to perform a frequency conversion. A frequency conversion can be used to smoothly convert a low-frequency periodic drive signal that uses a resonant pulse drive signal into a high-frequency periodic signal. This technique modifies the frequency of the pulse drive signal used in the low-frequency range until the drive signal is converted to a zero-mean bipolar-pulse (e.g., a fifty-percent duty-cycle periodic signal) at the high-frequency range, similar to the manner discussed above in connection with the transitional-frequency-range drive signal shown in FIG. 12C.

Equations 7, 8, and 9 refer to an embodiment where the frequency of the pulse $f_{pulse}$ generates haptic feedback that provides a user with a perception of a periodic signal at a desired frequency $f_{desired}$ with a particular magnitude m within the frequencies of the transitional frequency range shown in FIG. 10.

$$m = \frac{f_{res} - f_{high}}{f_{low} - f_{high}} \quad (7)$$

$$b = f_{res} - m \cdot f_{low} \quad (8)$$

$$f_{pulse} = m \cdot f_{desired} + b \quad (9)$$

In Equations 7, 8, and 9 above, m is the perceived magnitude of the haptic feedback, $f_{low}$ is the low-frequency limit, $f_{high}$ is the high-frequency limit, $f_{res}$ is the resonant frequency of the haptic device, and b is the damping constant.

Using Equations 7, 8, and 9 above, the pulse frequency $f_{pulse}$ required to provide a desired frequency $f_{desired}$ haptic output to a user can be readily determined. For example, if a haptic device has a resonant frequency $f_{res}$ of 200 Hz, and the low-frequency limit $f_{low}$ is 5 Hz and the high-frequency limit $f_{high}$ is 25 Hz, the pulse frequencies $f_{pulse}$ required to achieve the perception of the corresponding desired frequencies $f_{desired}$ are shown in Table 1 below.

TABLE 1

| Desired frequency $f_{desired}$ | Pulse frequency $f_{pulse}$ |
|---|---|
| 5 | 200 |
| 7 | 182.5 |
| 10 | 156.25 |
| 12 | 138.75 |
| 15 | 112.5 |
| 17 | 95 |
| 20 | 68.75 |
| 22 | 51.25 |
| 25 | 25 |

Using a frequency conversion technique, such as the technique described above, the perceived periodicity of haptic feedback experienced by a user is constant over all frequencies, including those within the transitional frequency range. More specifically, such a frequency conversion technique provides smooth "blending" of or transitioning between effects in the unidirectional operational mode associated with the low-frequency range and the harmonic operational mode associated with the high-frequency range. Additionally, using this frequency conversion technique, the magnitude of the pulse, which can be determined according to Equation 7, is preserved throughout the transition area, thereby providing haptic feedback having a consistent perceived magnitude to a user.

A duty-cycle-driven control method can also be used to convert low-frequency signals to a zero-mean bipolar-pulse (e.g., a fifty-percent duty-cycle periodic signal) at the high-frequency range, according to another embodiment of the invention. Such duty-cycle-driven control method can be used, for example, with drive signals, such as the drive signal shown in FIG. 12C. The duty-cycle-driven control method can be used to determine on-time $t_{on}$ in the same manner determined in both the low-frequency range and the high-frequency range, as explained above in connection with Equations 5 and 6, for example. As described above, the negative signal values serve as a brake pulse, or in other words, stops the motion associated with the previous pulse. Additionally, as described above, the negative on-time creates a large transition between positive and negative acceleration (i.e., between the positive portion of the signal and the negative portion of the signal), which results in a higher acceleration profile and a higher perceived force magnitude. The duty-cycle-driven control method achieves relatively effective periodicity, and increases the strength of the perceived haptic feedback. The duty-cycle-driven control method also provides a smooth perceived transition between all three frequency ranges shown in FIG. 10.

According to one or more embodiments of the invention, periodic haptic responses in the high-frequency range can be created using one of two techniques. For example, according to an embodiment of the invention, a high-frequency periodic response can be created using a zero-mean bipolar-pulse drive signal, as shown in FIG. 12B. According to another embodiment of the invention, a high-frequency periodic response can be created using a single resonant pulse every period, as shown in FIGS. 11A and 11B, for example. Around the resonant frequency $f_{res}$, the two techniques produce similar periods and magnitudes. Below the resonant frequency $f_{res}$, however, the zero-mean bipolar-pulse drive signal technique generally produces a perceived higher haptic feedback magnitude.

According to one or more embodiments of the invention, three distinct drive signals can be provided for haptic responses within each of the three frequency ranges shown in FIG. 10. For haptic feedback within the low-frequency range, a rectangular-wave signal can be provided. For haptic feedback within the transitional frequency range, an duty-cycle-driven control method can be used to determine the appropriate drive signal to be applied. For haptic feedback within the high-frequency range, a zero-mean bipolar-pulse drive signal can be used.

Figure 16:
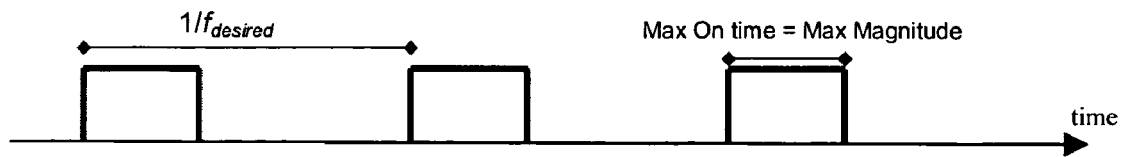
FIG. 16 is a plot showing an example of a signal used to drive a haptic device, according to an embodiment of the invention.

FIG. 16 is a plot showing an example of a signal used to drive a haptic device, according to an embodiment of the invention. The rectangular-wave signal shown in FIG. 16 is used to provide haptic responses within the low-frequency range shown in FIG. 10. The period T of the signal is determined by using the desired output frequency $f_{desired}$, as shown in Equation 4 above. The on-time $t_{on}$ can be calculated using Equations 5 and 6 above. As explained above in connection with those equations, the maximum on-time $t_{onmax}$ corresponds to the maximum magnitude M of the haptic feedback perceived by the user. For such an embodiment, for example, the maximum on-time $t_{onmax}$ is about two or three periods of the drive signal (e.g., two or three rotations of a rotating mass of a haptic device). According to an embodiment of the invention, the maximum on-time $t_{onmax}$ is approximately 80 milliseconds. This time can vary greatly, however, as it is dependent of the devices used, such as the actuator, mass, and other parameters. The maximum on-time $t_{onmax}$ can be a parameter stored in memory (e.g., in firmware or software, etc.) such that an interface device 20 can make use of a variety of haptic devices 24, each of which can have a different set of parameters including a maximum on-time $t_{onmax}$.

According to another embodiment of the invention, a drive signal supplied within the low-frequency range makes use of only unipolar pulses (i.e., positive-only or negative-only pulses), such as the unipolar pulse signal shown in FIG. 16, for example, to conserve energy, making the haptic device more power efficient. According to yet another embodiment of the invention, however, bipolar pulses (i.e., pulses having both negative and positive components) can be used to provide a response having a better defined periodicity because a negative pulse has the effect of stopping an effect from a previous positive pulse and vice versa.

Figure 17:
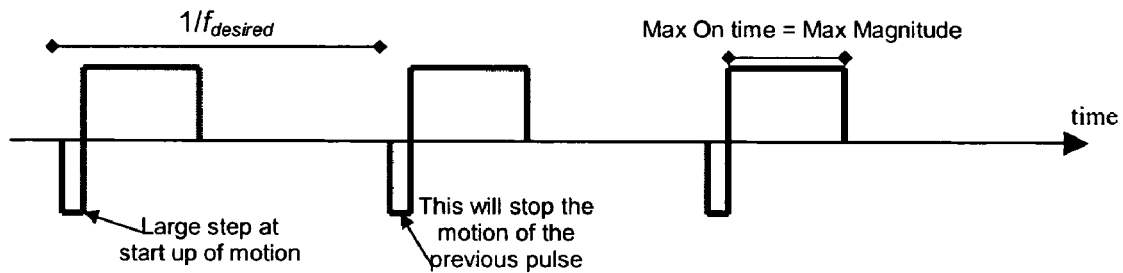
FIG. 17 is a plot showing an example of a signal used to drive a haptic device, according to an embodiment of the invention.

FIG. 17 is a plot showing an example of a signal used to drive a haptic device, according to an embodiment of the invention. The drive signal shown in FIG. 17 is used to provide haptic sensations within the transitional frequency range, and is calculated using a duty-cycle-driven control method, such as the ones described above in connection with Equations 5 and 6. The drive signal in FIG. 17 is bi-directional, which provides a large transition from the negative portions of the signal to the positive portions of the signal. This bi-directional nature of the drive signal produces a larger perceived magnitude of the haptic effect generated. The bi-directional nature of the drive signal shown in FIG. 17 also stops motion generated from a previous pulse (i.e., it has a "braking" effect).

The period T of the drive signal shown in FIG. 17 is calculated as described above in connection with Equation 4, using the desired frequency $f_{desired}$. As explained above in connection with Equations 4, 5, and 6, the maximum on-time $t_{onmax}$ corresponds to the maximum magnitude M of the haptic feedback generated. In one embodiment, the short negative pulse preceding each positive on-time $t_{on}$ is relatively short compared to the positive on-time $t_{on}$, and has the effect of stopping the motion associated with the previous on-time $t_{on}$, but is not perceived by a user (except as a transient artifact of the feedback). For example, the duration of the negative pulse can be approximately 10 ms.

The duty cycle of the drive signal can steadily increase as the haptic feedback transitions from the transitional frequency range to the high-frequency range shown in FIG. 10. A drive signal having a duty cycle of fifty percent can used in the high-frequency range shown in FIG. 10, such as the drive signal shown in FIG. 12B, for example.

Rectangular-wave drive signals (including, e.g., square-wave drive signals), such as those described above, are frequently used to convey a strong periodic haptic sensation to a user. These types of sensations conveyed by the rectangular-wave drive signals are sometimes referred to as "square-like" sensations. These square-like sensations, however, are not the only type of sensations desired for haptic feedback. For example, when a haptic device is being driven in the harmonic operational mode, or within the high-frequency range, it may be advantageous to use other drive signal forms because the high-frequency components of such drive signals can be felt and distinguished by users of a haptic device. Some examples of drive signal shapes that can be used to drive a haptic device in harmonic operational mode to produce different haptic sensations than those experienced with a square-wave drive signal including, for example, a saw-like wave, a sinusoid, or the like.

Figure 18:
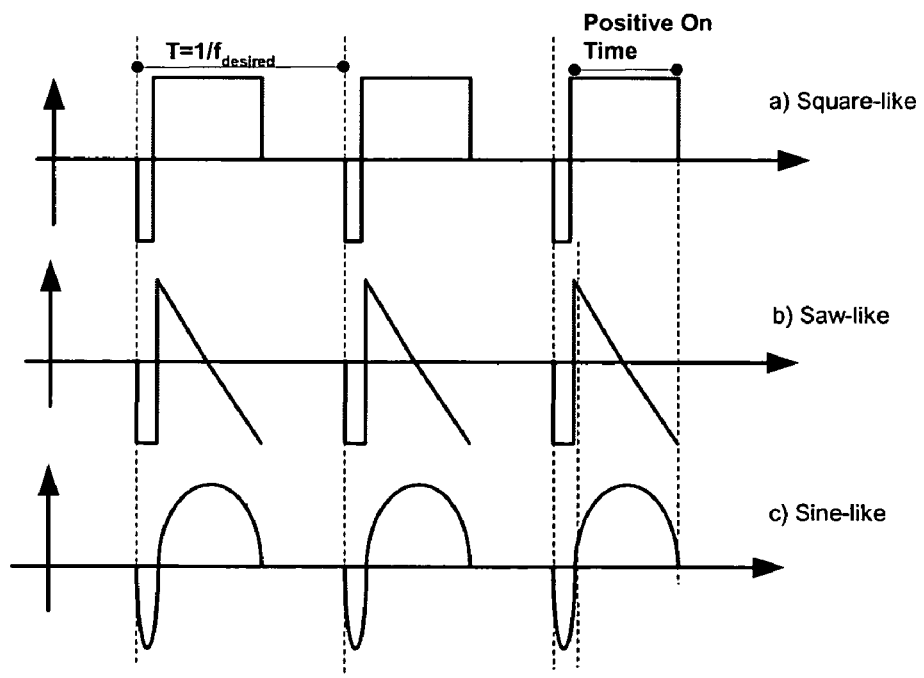
FIGS. 18A-18C are plots showing examples of signals used to drive a haptic device, according to an embodiment of the invention.

FIGS. 18A-18C are plots showing examples of signals used to drive a haptic device, according to one or more embodiments of the invention. The drive signal shown in FIG. 18A is a square wave similar to the transitional frequency range drive signal shown in FIGS. 17 and 12C. The drive signals shown in FIGS. 18B and 18C are saw-like and sinusoidal waves, respectively. All of the drive signals shown in FIGS. 18A-18C are configured with varying duty cycles using similar techniques to those described above in connection with FIGS. 17 and 12C with similar effects. Specifically, the drive signals shown in FIGS. 18A-18C have a short negative pulse prior to the on-time of each drive signal. This short pulse accomplishes a large initial transition, perceived by a user as a larger magnitude of the haptic feedback, and helps stop or slow down motion of a haptic device from the prior on-time signal (i.e., performs a "braking" function).

In addition to shaping drive signals used to drive haptic devices capable of providing multiple operational modes (e.g., unidirectional, harmonic, etc.), other techniques of controlling haptic devices are possible. For example, whether a haptic device is acting in a unidirectional or harmonic operational mode, a fast response time that exhibits no perceived lag to a user may be desired. Force applied to a haptic device (e.g., by way of an applied voltage signal), however, sometimes results in a start-up lag that may be detectable by a user. Such start-up lags can detract from the user's haptic experience for some applications.

The force F applied to a haptic device, such as the haptic device 24 shown in FIG. 1, by a haptic device having rotating mass (e.g., a haptic device having an eccentric rotating mass operating in a unidirectional operational mode or a haptic device having a harmonic eccentric rotating mass operating in a unidirectional operational mode) is directly proportional to the square of the angular velocity ω. This force F can be calculated as shown below in Equation 10.

$$F = \epsilon_r \cdot \omega^2 \quad (10)$$

In Equation 10 above, $\epsilon_r$ is dependent on the size and shape of the rotating mass (i.e., it is dependent on the moment of inertia of the mass). This force F can only be detected by a user above a certain threshold of angular velocity ω. Thus, delays in ramping up the angular velocity ω of the rotating mass result in a delay of the haptic feedback felt by the user. For example, in gaming applications, where the haptic device 24 of the user device 20 uses a large rotating mass, this delay can be as long as approximately 60 ms. Such a significant delay can be felt by a user, and detracts from the haptic sensation experienced by the user. Thus, in some embodiments, decreasing the delay to synchronize the visual display of a haptic feedback triggering event with the corresponding haptic feedback is highly desirable in all operational modes, including, for example, the operational modes corresponding to the three frequency ranges shown in FIG. 10.

Figure 19A:
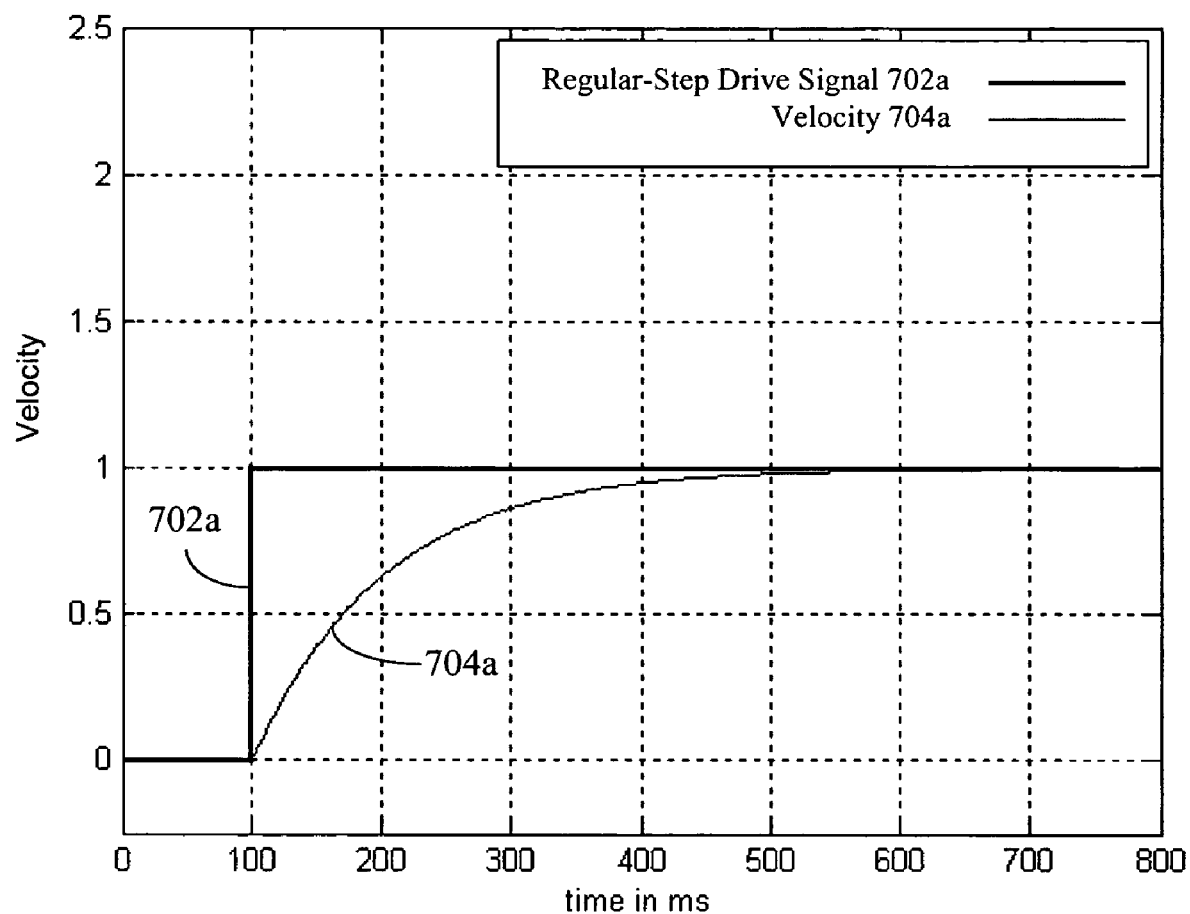
FIG. 19A is a plot showing an example of a step signal used to drive a haptic device and the corresponding response of the haptic device, according to an embodiment of the invention.

FIG. 19A is a plot showing an example of a regular-step drive signal 702a used to drive a haptic device. According to one or more embodiments of the invention, this regular-step drive signal 702a can be referred to as a steady-state signal, or a signal configured to provide steady-state power to a haptic device. Time is shown in milliseconds on the horizontal axis, and relative velocity (of the haptic device) is shown on the vertical axis (which is similarly the case for the remaining figures). The velocity 704a of the haptic device that results from the regular-step drive signal 702a is also shown on the same plot as a curve. As can be seen in FIG. 19A, a delay occurs between the initiation of the regular-step drive signal 702a and the achievement of full velocity 704a (i.e., the steady-state velocity) of the haptic device. In some circumstances, this delay can be perceived by a user, which may be undesirable in certain applications.

Figure 19B:
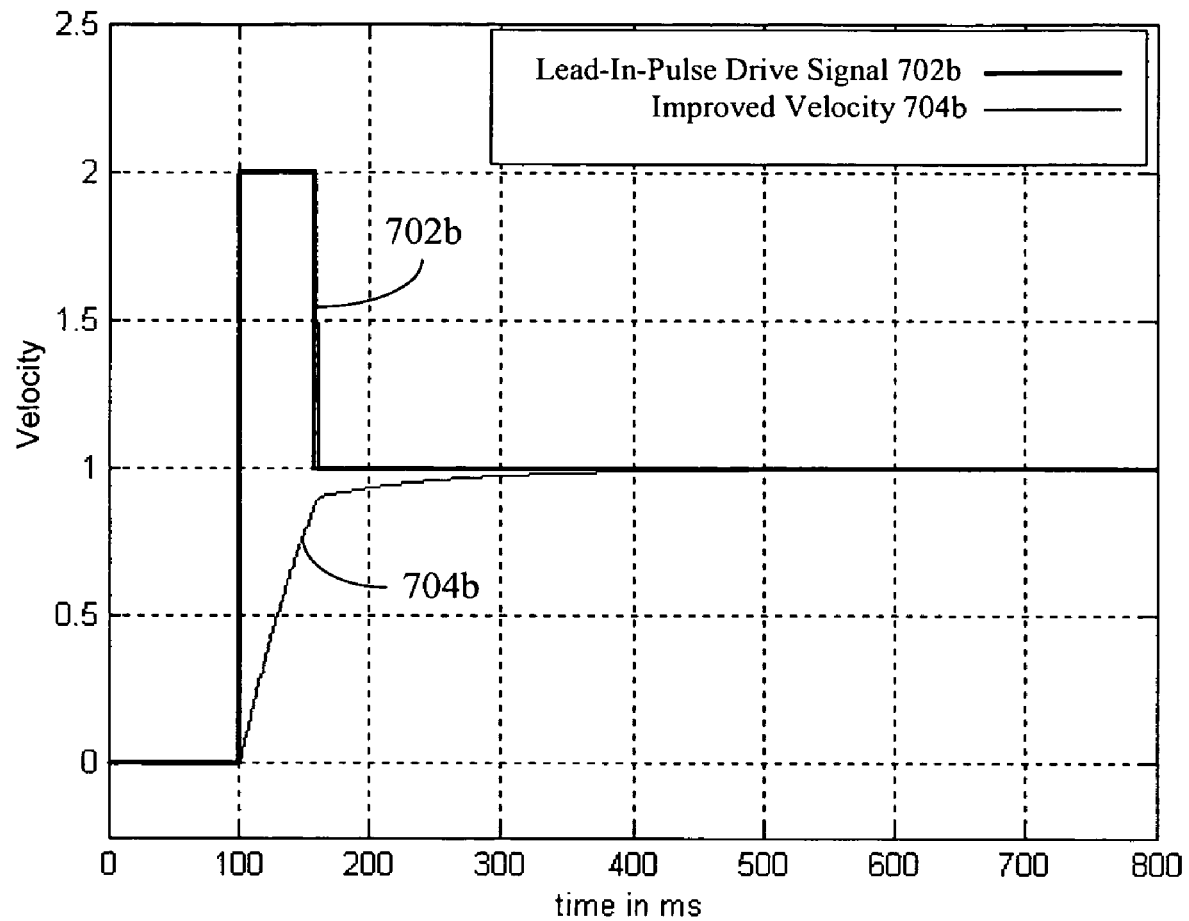
FIG. 19B is a plot showing an example of a signal used to drive a haptic device and the corresponding response of the haptic device, according to an embodiment of the invention.

FIG. 19B is a plot showing an example of a signal 702b used to drive a haptic device, according to an embodiment of the invention. The lead-in-pulse drive signal 702b shown in FIG. 19B incorporates a lead-in pulse, and can be used to provide a haptic sensation without a lag time associated with a regular-step drive signal (e.g., the regular-step drive signal 702a shown in FIG. 19A). In other words, the lead-in-pulse drive signal causes an improved velocity 704b, or reduced response time, of the haptic device as shown in FIG. 19B. The lead-in-pulse drive signal 702b begins with a pulse configured to accelerate the haptic device to full velocity quicker than the regular-step drive signal 702a shown in FIG. 19A. According to an embodiment of the invention, the lead-in pulse of the lead-in-pulse drive signal 702b can be provided by quickly discharging a capacitor when required. Such a capacitor can be trickle charged, for example, so that it is capable of providing the lead-in pulse when it is required.

In addition to delays associated with initiating tactile forces (e.g., haptic feedback), delays also sometimes exist during termination of such tactile forces (e.g., haptic feedback). For example, because of momentum gained by a rotating mass or other haptic device, termination of a drive signal does not immediately terminate the motion of the device. This response-time lag can be detected by users, which may be undesirable in certain applications. The response-time lag is more pronounced in some applications, such as some video gaming applications that use heavier rotating masses, or other haptic devices having large moments of inertia.

Figure 20A:
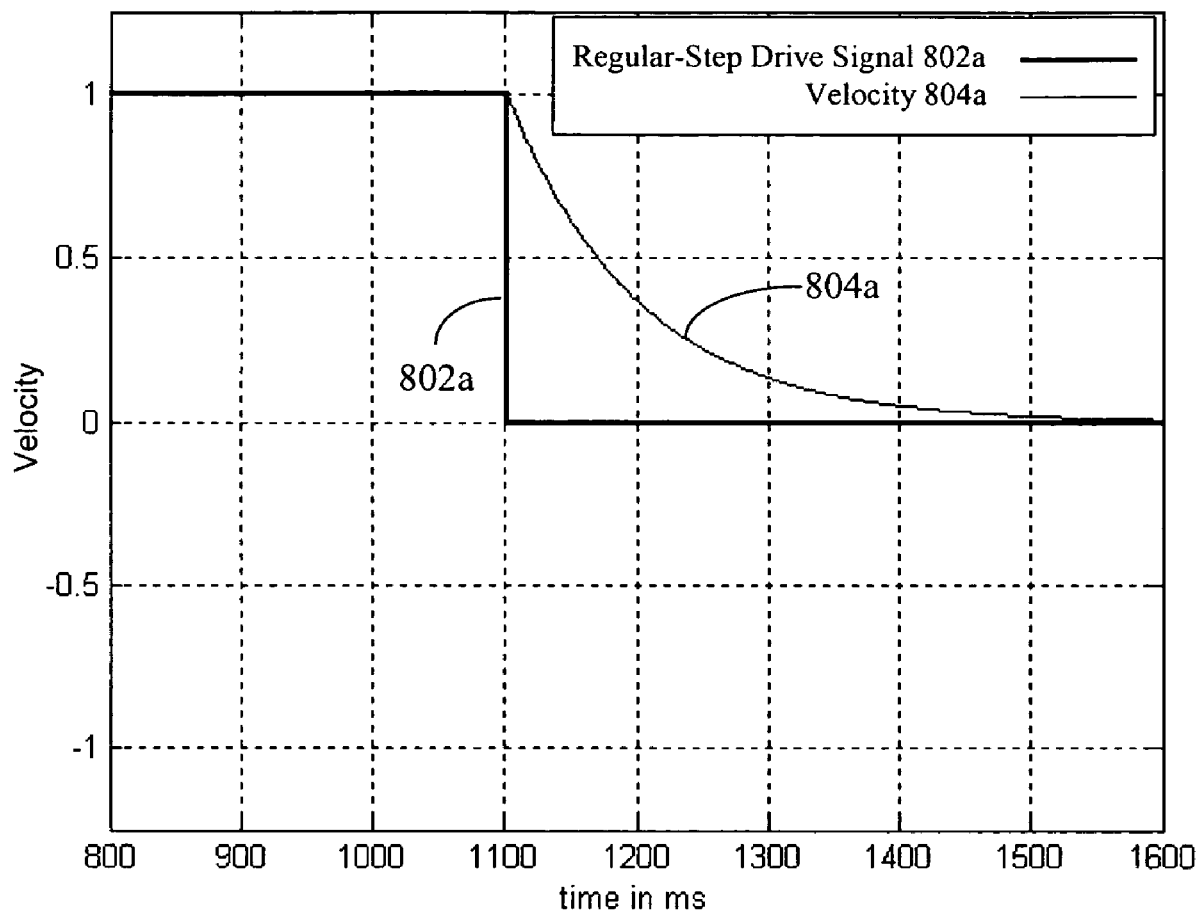
FIG. 20A is a plot showing an example of a step signal used to drive a haptic device and the corresponding response of the haptic device, according to an embodiment of the invention

FIG. 20A is a plot showing an example of a regular-step drive signal 802a used to drive a haptic device. The plot in FIG. 20A shows the regular-step drive signal 802a, ends as a step function, thereby terminating steady-state power to the haptic device. As can be seen by the resultant stopping velocity 804a shown in FIG. 20A, a delay occurs in stopping the haptic device, which can be perceived, in some circumstances, by a user. Such a delay may be undesirable in certain applications.

Figure 20B:
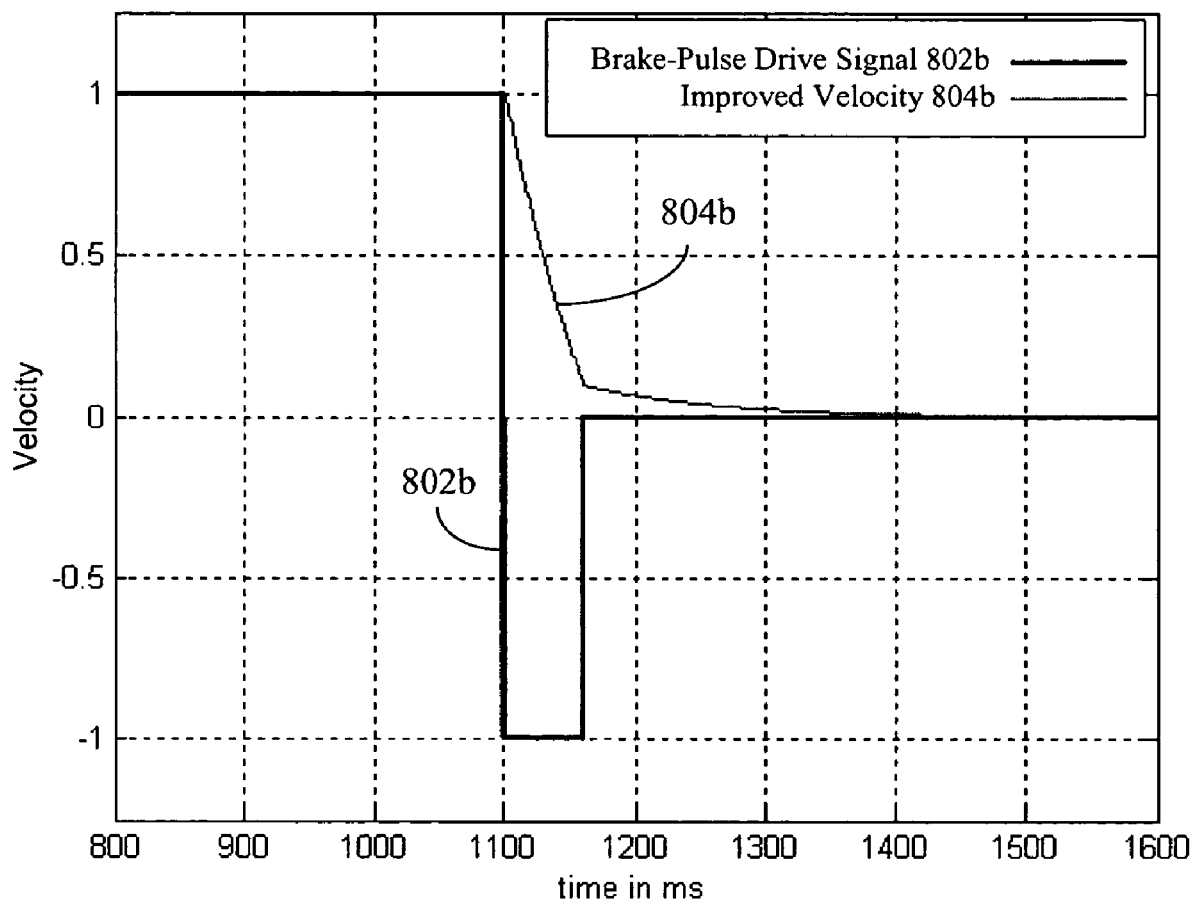
FIG. 20B is a plot showing an example of a signal used to drive a haptic device and the corresponding response of the haptic device, according to an embodiment of the invention.

FIG. 20B is a plot showing an example of a signal 802b used to drive a haptic device, according to an embodiment of the invention. The brake-pulse drive signal 802b used in FIG. 20B includes a portion having a negative pulse prior to a potion of the drive signal 802b having zero power. This negative pulse (also referred to as a brake or braking pulse) results in the improved velocity 804b shown in FIG. 20B, which has improved stopping characteristics compared to devices using a regular-step drive signal 802a (shown in FIG. 20A). Specifically, the brake-pulse drive signal 802b stops a rotating mass or other haptic device more quickly than with a regular step drive signal 802a. As with the lead-in-step drive signal 702b (shown in FIG. 19B), the brake-pulse drive signal 802b can be produced, for example, by discharging a previously charged capacitor.

Drive signals implementing the lead-in pulse and of the lead-in-pulse drive signal 702b, and the negative pulse of the brake-pulse drive signal 802b can be combined to provide haptic feedback having a reduced lag time (i.e., a reduced response time) at both the beginning and end of the feedback. The drive signals described above in connection with FIGS. 19B and 20B can be created via computer programming code that can be programmed in software, firmware, or hardware, according to the desired performance and/or design constraints of the system.

The effects described above in connection with FIGS. 19B and 20B can be implemented in any of the operational modes (e.g., unidirectional, harmonic, transitional, etc.) associated with the invention. Additionally, these effects can be implemented within all of the frequency ranges shown in FIG. 10 to provide quicker response within each of these ranges.

From the foregoing, it can be seen that systems and methods for controlling multi-mode haptic devices are discussed. Specific embodiments have been described above in connection with a multi-mode haptic device that has multiple operational modes (e.g., unidirectional, harmonic, etc.), and which operates within multiple frequency ranges including: a low-frequency range, a low-high transition range, and a high-frequency range. Additionally, specific embodiments have been described in the context of haptic devices using rotating masses to produce haptic feedback.

It will be appreciated, however, that embodiments of the invention can be in other specific forms without departing from the spirit or essential characteristics thereof. For example, while some embodiments have been described in the context of a multi-mode haptic device operating within three frequency ranges, a multi-mode haptic device can have multiple operational modes that span multiple frequency ranges in excess of the three discussed above. For example, such a haptic device could operate within multiple frequency ranges corresponding to multiple harmonics of the device. These multiple frequency ranges can have multiple transition frequency ranges therebetween. Additionally, other types of actuators, spring-mass systems, and feedback devices can be used to provide haptic device according to the principles of the invention disclosed above. The presently disclosed embodiments are, therefore, considered in all respects to be illustrative and not restrictive.

What is claimed is:

1. An apparatus, comprising:
    a haptic device having a plurality of operational modes including a first operational mode and a second operational mode, the first operational mode being associated with a frequency range, the second operational mode being associated with a frequency range being different from the frequency range of the first operational mode, and a third, transitional operational mode associated with a frequency range that lies between the frequency ranges of the first and second operational modes; and
    a controller coupled to the haptic device, the controller configured to send the haptic device a plurality of control schemes each being uniquely associated with an operational mode from the plurality of operational modes.

2. The apparatus of claim 1, wherein the controller is configured to combine each control scheme from the plurality of control schemes prior to sending the plurality of control schemes to the haptic device.

3. The apparatus of claim 1, wherein the controller is configured to superimpose each control scheme from the plurality of control schemes prior to sending the plurality of control schemes to the haptic device, the plurality of control schemes being superimposed according to a pre-determined proportion of operational modes from the plurality of operational modes.

4. The apparatus of claim 1, wherein the controller is configured to provide transitional control schemes associated with at least two operational modes from the plurality of operational modes, the transitional control schemes are configured to combine at least a portion of each control scheme from the plurality of control schemes uniquely associated with each of the at least two operational modes.

5. The apparatus of claim 1, wherein the controller is configured to provide transitional control schemes associated with at least two operational modes from the plurality of operational modes, the transitional control schemes are configured to superimpose at least a portion of each control scheme from the plurality of control schemes uniquely associated with each of the at least two operational modes.

6. The apparatus of claim 1, wherein the haptic device includes a rotating mass.

7. The apparatus of claim 1, wherein the haptic device includes a rotating mass, the rotating mass having at least one harmonic response frequency, each at least one harmonic response frequency uniquely corresponding to an operational mode from the plurality of operational modes.

8. The apparatus of claim 1, wherein the controller is configured to control the haptic device using pulse width modulation (PWM).

9. The apparatus of claim 1, wherein the controller is further configured to cause the at least one haptic device to output a first haptic response associated with the first operational mode and a second haptic response associated with the second operational mode.

10. The apparatus of claim 1, wherein the controller is further configured to cause the at least one haptic device to output a first haptic response associated with the first operational mode, a second haptic response associated with the second operational mode, and a transitional haptic response associated with a combination of the first haptic response and the second haptic response.

11. The apparatus of claim 1, wherein the haptic device has at least one of a variable moment and a variable resonance frequency, the controller being configured to send a signal configured to vary the at least one moment and variable resonance frequency.

12. An apparatus, comprising:
    a haptic device configured to provide at least three haptic feedback responses, each haptic feedback response being uniquely associated with an operational mode of the haptic device and with a particular one of first, second and third frequencies, wherein the second frequency is a transitional frequency that lies between the first and third frequencies; and
    means for combining the haptic feedback responses based on at least one pre-determined parameter to produce a multi-mode haptic feedback response.

13. The apparatus of claim 12, wherein the haptic device is configured to provide a low-frequency response and a high-frequency response.

14. The apparatus of claim 12, further comprising:
    means for controlling the haptic device, the means for controlling the haptic device being configured to control the response of the haptic device within a plurality of operational modes.

15. The apparatus of claim 12, further comprising:
    means for controlling the haptic device, the haptic device having a variable moment, the means for controlling being configured to vary the moment of the haptic device.

16. The apparatus of claim 12, further comprising:
    means for controlling the haptic device, the haptic device having a variable moment, the means for controlling being configured to vary the moment of the haptic device by varying a velocity of the haptic device.

17. The apparatus of claim 12, further comprising:
means for controlling the haptic device, the haptic device having a variable moment, the means for controlling being configured to vary the moment of the haptic device by varying a direction of the haptic device.

18. A processor-readable medium comprising code representing instructions to cause a processor to:
send a first control signal to at least one haptic device collectively having a plurality of operational modes including a first operational mode and a second operational mode, the first control signal being associated with the first operational mode and a frequency range; and
send a second control signal to the at least one haptic device, the second control signal being associated with the second operational mode and a frequency range, the frequency range of the second control signal being different from the frequency range of the first operational mode, the second control signal being different from the first control signal; and
send a third control signal to the at least one haptic device, the third control signal being associated with a third transitional operational mode and a frequency range that lies between the first and second frequency ranges.

19. The processor-readable medium of claim 18, further comprising code representing instructions to cause a processor to:
combine the first operational mode and the second operational mode by varying a duty cycle of at least one of the first control signal and the second control signal.

20. The processor-readable medium of claim 18, further comprising code representing instructions to cause a processor to:
combine the first operational mode and the second operational mode by augmenting at least a portion of one of the first control signal and the second control signal.

21. The processor-readable medium of claim 18, further comprising code representing instructions to cause a processor to:
combine the first operational mode and the second operational mode by a feedback algorithm based upon at least a portion of one of the first control signal and the second control signal.

22. The processor-readable medium of claim 18, further comprising code representing instructions to cause a processor to:
change a moment of the at least one haptic device.

23. The processor-readable medium of claim 18, further comprising code representing instructions to cause a processor to:
change a moment of the at least one haptic device by varying a velocity of the at least one haptic device.

24. The processor-readable medium of claim 18, further comprising code representing instructions to cause a processor to:
change a moment of the at least one haptic device by varying the direction of movement of the at least one haptic device.

25. A method, comprising:
producing a first frequency response using a haptic device, the first frequency response being associated with a first frequency range;
producing a second frequency response using the haptic device, the second frequency response being associated with a second frequency range that is separated from the first frequency range by a transition frequency range that lies between the first and second frequency ranges; and
adjusting a response of the haptic device based on at least one pre-determined parameter to produce a transitional response in the transition frequency range.

26. The method of claim 25, wherein the adjusting includes:
combining the first frequency response and the second frequency response of the haptic device.

27. The method of claim 25, wherein the adjusting includes:
summing the first frequency response and the second frequency response of the haptic device.

28. The method of claim 25, wherein the adjusting includes:
multiplying the first frequency response and the second frequency response of the haptic device.

29. The method of claim 25, wherein the adjusting includes:
performing a scalar adjustment of at least one of the first frequency response and the second frequency response.

30. The method of claim 25, wherein the adjusting includes:
performing a scalar adjustment of at least one of the first frequency response and the second frequency response, the scalar adjustment being based on characteristics of the haptic device.

31. The method of claim 25, wherein the adjusting includes:
superimposing the response of the first frequency response and the second frequency response.

32. The method of claim 25, wherein the adjusting includes:
controlling the first frequency response and the second frequency response using a feedback algorithm.

33. The method of claim 25, further comprising:
varying a moment of the haptic device.

34. A method, comprising:
sending a first control signal to at least one haptic device collectively having a plurality of operational modes including a first operational mode and a second operational mode, the first control signal being associated with the first operational mode and a frequency range;
sending a second control signal to the at least one haptic device, the second control signal being associated with the second operational mode and a frequency range, the frequency range of the second control signal being different from the frequency range of the first operational mode, the second control signal being different from the first control signal; and
sending a third control signal to the at least one haptic device, the third control signal being associated with a third transitional operational mode and a frequency range that lies between the first and second frequency ranges.

35. The method of claim 34, further comprising:
combining the first operational mode and the second operational mode by directly summing at least a portion of one of the first control signal and the second control signal.

36. The method of claim 34, further comprising:
combining the first operational mode and the second operational mode by multiplying at least a portion of one of the first control signal and the second control signal.

37. The method of claim 34, further comprising:
combining the first operational mode and the second operational mode by summing products associated with at least a portion of one of the first control signal and the second control signal.

38. The method of claim 34, further comprising:
combining the first operational mode and the second operational mode by augmenting at least a portion of one of the first control signal and the second control signal.

39. The method of claim 34, further comprising:
combining the first operational mode and the second operational mode by a feedback algorithm based upon at least a portion of one of the first control signal and the second control signal.

40. The method of claim 34, wherein the first signal is further configured to vary a moment of the haptic device by varying one of a velocity of the haptic device and a direction of the haptic device.

* * * * *